United States Patent
Yoshioka

(10) Patent No.: US 9,053,370 B2
(45) Date of Patent: Jun. 9, 2015

(54) DIGITAL SIGNATURE APPARATUS AND METHOD

(75) Inventor: Takashi Yoshioka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 12/971,418

(22) Filed: Dec. 17, 2010

(65) Prior Publication Data

US 2011/0150269 A1 Jun. 23, 2011

(30) Foreign Application Priority Data

Dec. 21, 2009 (JP) ................................. 2009-289816

(51) Int. Cl.
| | |
|---|---|
| G06K 9/00 | (2006.01) |
| H04N 21/234 | (2011.01) |
| H04N 21/8358 | (2011.01) |
| H04N 21/266 | (2011.01) |
| H04N 21/6334 | (2011.01) |
| H04N 21/6377 | (2011.01) |

(52) U.S. Cl.
CPC ...... *G06K 9/00744* (2013.01); *H04N 21/23418* (2013.01); *H04N 21/26613* (2013.01); *H04N 21/63345* (2013.01); *H04N 21/63775* (2013.01); *H04N 21/8358* (2013.01)

(58) Field of Classification Search
CPC .............................................. H04N 2201/3233
See application file for complete search history.

(56) References Cited

U.S. PATENT DOCUMENTS

| | | | | |
|---|---|---|---|---|
| 6,785,335 | B1* | 8/2004 | Layeghi ..................... | 375/240.2 |
| 6,934,331 | B2* | 8/2005 | Kamikura et al. ........ | 375/240.12 |
| 8,365,214 | B2* | 1/2013 | Soo et al. ...................... | 725/31 |
| 2002/0178368 | A1* | 11/2002 | Yin et al. ...................... | 713/186 |
| 2006/0153296 | A1* | 7/2006 | Deng ........................ | 375/240.12 |
| 2006/0203920 | A1* | 9/2006 | Yongfang et al. ......... | 375/240.28 |
| 2008/0256362 | A1 | 10/2008 | Takenaka et al. | |
| 2008/0292267 | A1 | 11/2008 | Yamada et al. | |
| 2010/0177891 | A1* | 7/2010 | Keidar et al. ................. | 380/200 |
| 2010/0211793 | A1* | 8/2010 | Park et al. ..................... | 713/176 |
| 2011/0243458 | A1* | 10/2011 | Yoshioka ...................... | 382/209 |

FOREIGN PATENT DOCUMENTS

| | | |
|---|---|---|
| JP | 2006-074690 | 3/2006 |
| JP | 2008-178048 | 7/2008 |

OTHER PUBLICATIONS

Le Gall, D., MPEG: A Video Compression Standard for Multimedia Applications, 1991, Communications of the ACM, vol. 32, No. 4, pp. 46-58.*

Al-Najdawi, A. and Kalawsky, R.S., Quantitative Quality Assessment of Video Sequences, 2007, ICICS 2007, pp. 1-5.*

Schneider, M. and Chang, S., A Robust Content Based Digital Signature for Image Authentication, 1996, International Proceedings on Image Processing, vol. 3, pp. 227-230.*

* cited by examiner

*Primary Examiner* — Stephen R Koziol
*Assistant Examiner* — Jonathan S Lee
(74) *Attorney, Agent, or Firm* — Fujitsu Patent Center

(57) ABSTRACT

A digital signature apparatus including, a converting unit that converts, based on a first video image frame being independently replayable, a predicted frame being not independently replayable into a second video image frame being independently replayable, an encoding unit that encodes the first or second video image frame into an image data according to an image format, a transfer unit that transfers, when receiving the predicted frame, the predicted frame to the converting unit, and transfers, when receiving the first or second video image frame, the received video image frame to the encoding unit, and a digest information generating unit that generates a digest information for each of image data encoded by the encoding unit.

20 Claims, 30 Drawing Sheets

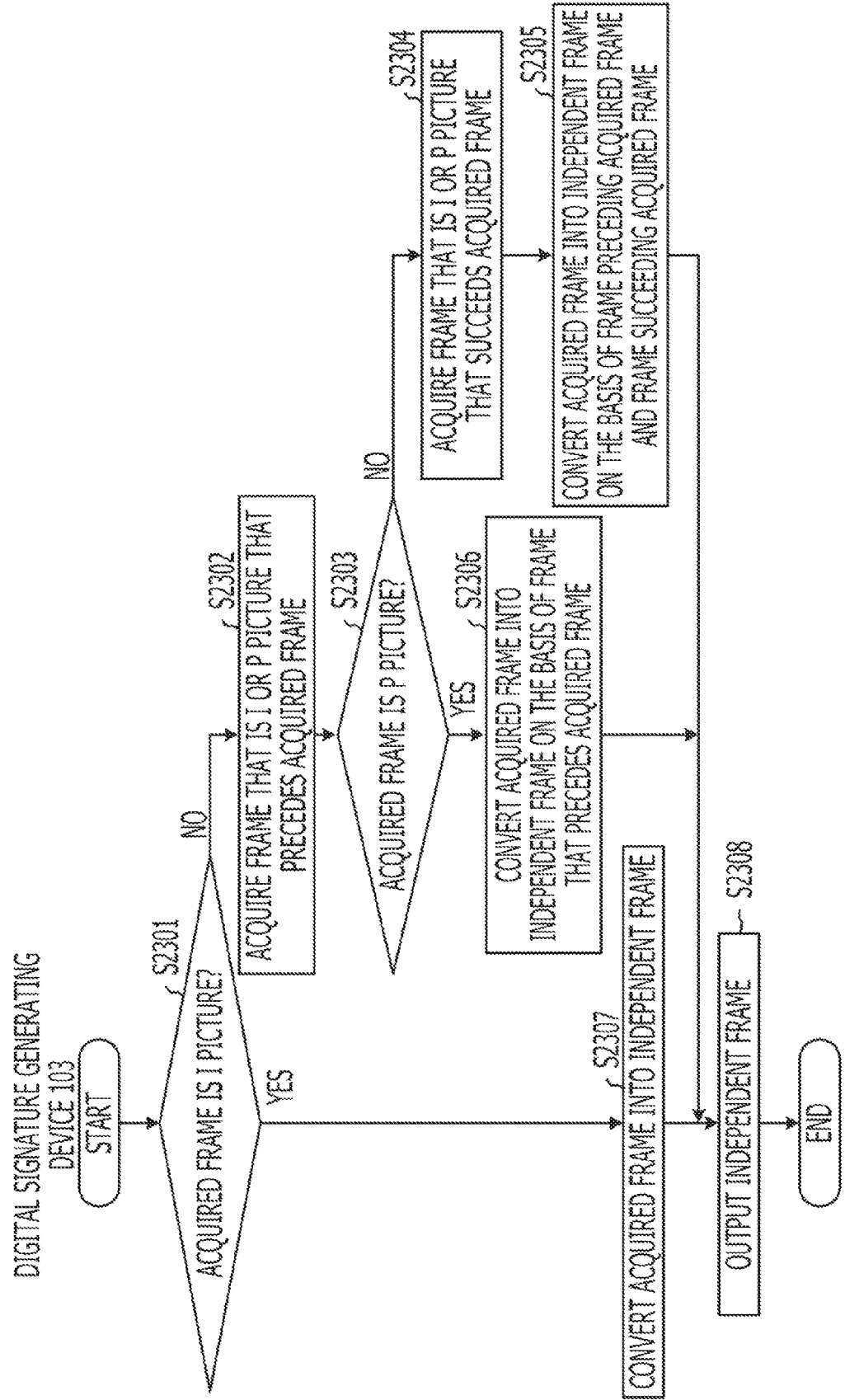

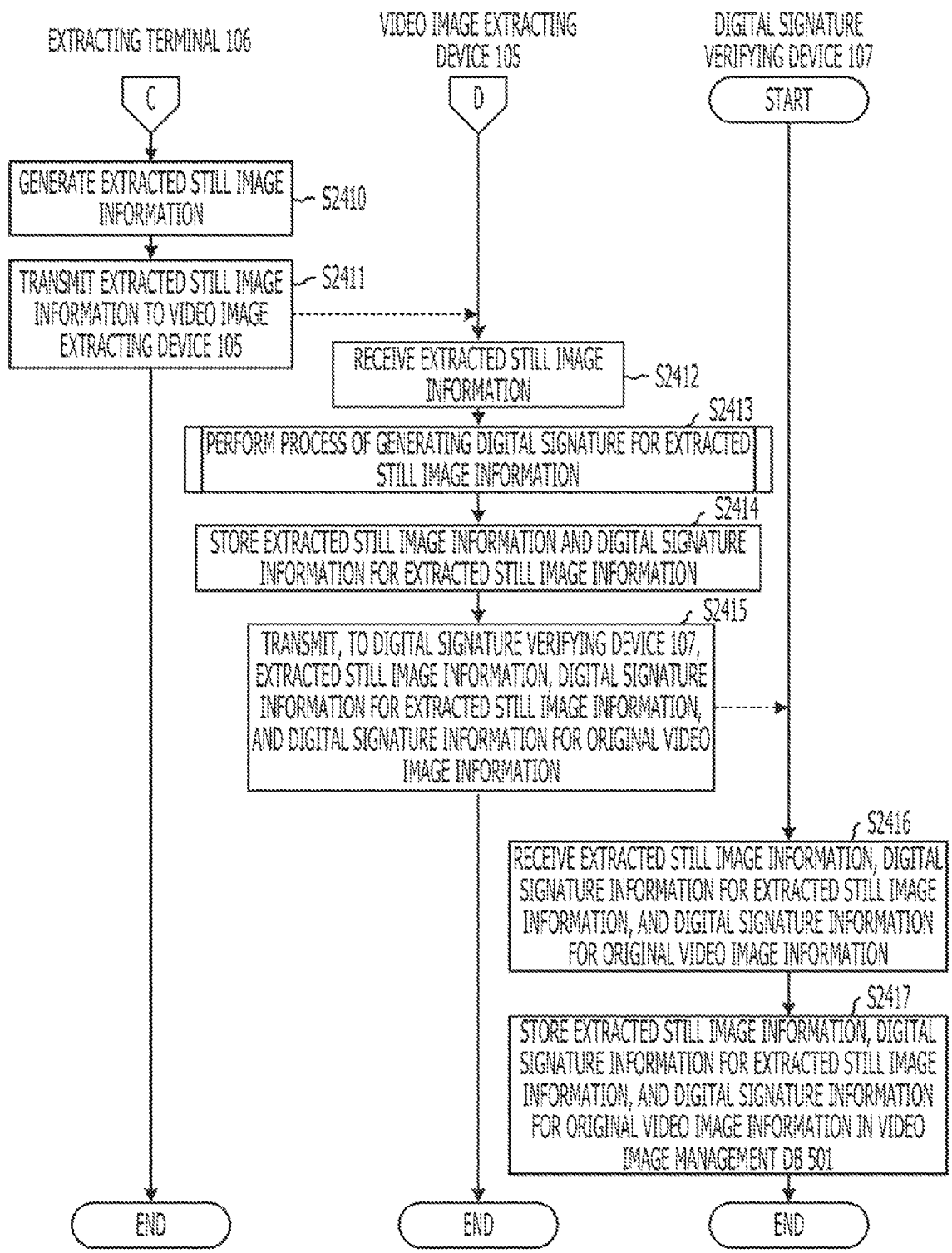

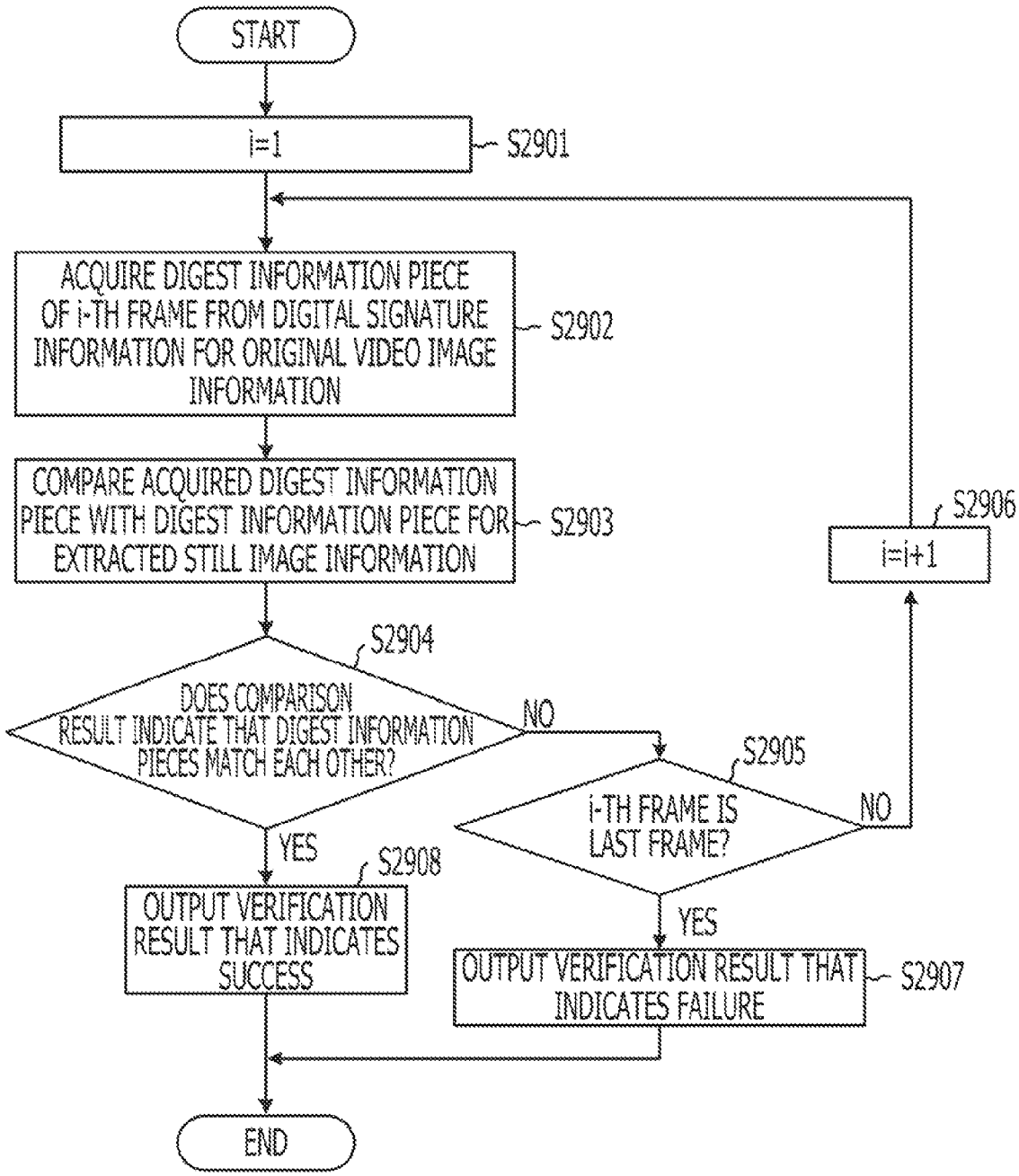

DIGITAL SIGNATURE APPARATUS AND METHOD

CROSS-REFERENCE TO RELATED APPLICATION

This application is based upon and claims the benefit of priority of the prior Japanese Patent Application No. 2009-289816, filed on Dec. 21, 2009, the entire contents of which are incorporated herein by reference.

FIELD

The embodiment discussed herein relates to a digital signature apparatus and method for generating and verifying a digital signature.

BACKGROUND

In recent years, it has been general practice to install security cameras in shops, downtown areas, housing complexes and the like and install vehicle drive recorders or the like in commercial vehicles. The number of cases in which video images are used as material evidence has increased. Currently, when a video image or a sound is used as evidence, a video tape, an image file or the like is submitted without change. However, when an image and a sound are digitalized and stored, the image and the sound can be easily altered and edited. When the video image or the sound is used as evidence, third party authentication such as a digital signature or a timestamp is necessary. Currently, services and products that record voices of telephone operators with timestamps are being sold. It is expected that needs for such techniques will increase in the future.

As a technique for detecting alteration performed by a third party, there is a technique for using a method for dividing the contents of a digital document into data, calculating a summary information for each of the data, and adding a digital signature to a group of the summary information for the data. In this case, the summary information correspond to hash information calculated using a cryptographic one-way hash function and are also called message digests. When this technique is used for video image data, it is possible to ensure the originality of the video image data and extract a data to be digitally signed while privacy can be protected (for example Japanese Laid-open Patent Publication No. 2008-178048).

In addition, since video image data has a large amount of data, there are various techniques for compressing video data. Among the compression techniques, there is an inter-frame prediction technique. For example, the inter-frame prediction technique is used for video image data so that the video image data is compressed into Motion Picture Expert Group-1 (MPEG-1) format. The video image data compressed in MPEG-1 format includes three types of images, which are I pictures, P pictures and B pictures. The I pictures maintain all images necessary to be displayed as a video image. The P pictures each maintain the difference between the P picture and an I picture that precedes the P picture. The B pictures each maintain the difference between the B picture and a P or I picture preceding the B picture and the difference between the B picture and a P or I picture succeeding the B picture. Since the P pictures each maintain the difference between the current image and the previous image, and the B pictures each maintain the difference between the current image and the images preceding and succeeding the B picture, the data can be compressed at a high compression rate.

In order to decompress video image data compressed by the inter-frame prediction technique, it is necessary to perform a large amount of processing. To avoid this, the following technique is disclosed in Japanese Laid-open Patent Publication No. 2006-74690: a technique for extracting frames (I pictures), encoding the frames into still images on a frame basis, and thereby quickly reproducing video image data.

SUMMARY

According to an aspect of the invention, a digital signature apparatus includes, a converting unit that converts, based on a first video image frame being independently replayable, a predicted frame being not independently replayable into a second video image frame being independently replayable, an encoding unit that encodes the first or second video image frame into an image data according to an image format, a transfer unit that transfers, when receiving the predicted frame, the predicted frame to the converting unit, and transfers, when receiving the first or second video image frame, the received video image frame to the encoding unit, and a digest information generating unit that generates a digest information for each of image data encoded by the encoding unit.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 23 is a flowchart of a process of generating an independent frame;

FIGS. 24A and 24B are a flowchart of a process of generating extracted still image information;

FIG. 29 is a flowchart of a process of verifying that the extracted still image information is a part of the original video image information.

DESCRIPTION OF EMBODIMENTS

A digital signature apparatus according to the embodiment, a digital signature method according to the embodiment, and a digital signature program according to the embodiment are described below in detail with reference to the accompanying drawings. In the present embodiment, a digital signature generating device and a digital signature verifying device are separately described as the digital signature device. The digital signature generating device has a function of generating a digital signature, while the digital signature verifying device has a function of verifying a digital signature. As described in the present embodiment, the digital signature apparatus may be divided into the digital signature generating device and the digital signature verifying device, while the digital signature generating device and the digital signature verifying device are separately operated. In addition, the digital signature apparatus may have the function of generating a digital signature and the function of verifying a digital signature.

Figure 1:
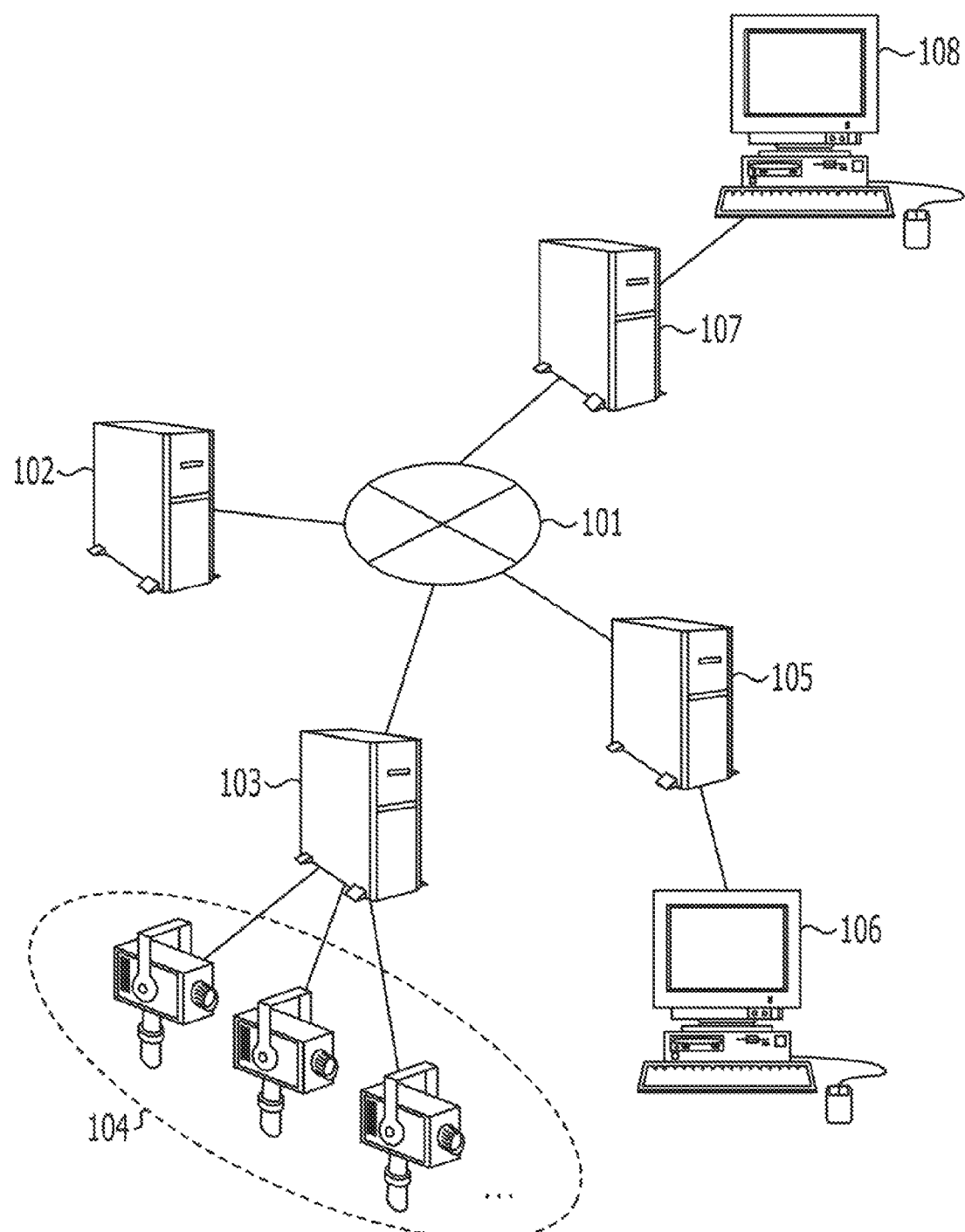
FIG. 1 is a diagram illustrating an example of the configuration of a system.

FIG. 1 is a diagram illustrating the configuration of a system according to the present embodiment. The system includes an authenticating device 102, a digital signature generating device 103, a video image extracting device 105 and a digital signature verifying device 107. The system can be connected to a network 101. The digital signature generating device 103 is connected to a plurality of video image recording terminals 104. The video image extracting device 105 is connected to an extracting terminal 106. The digital signature verifying device 107 is connected to a verifying terminal 108.

The network 101 corresponds to any of all communication networks such as the Internet, intranets and wide area networks. The authenticating device 102 is a server of an authentication organization that manages digital signature information. A digital signature is information that is obtained by encrypting summary information (obtained by summarizing information to be digitally signed) using a private key that is held by a transmitting device. The transmitting device transmits the encrypted digital signature, the information to be digitally signed, and a public key certificate to a receiving device. The receiving device confirms the validity of the public key certificate and decrypts the encrypted digital signature using a public key included in the public key certificate. Then, the receiving device compares the decrypted digital signature with the summary information obtained from the information to be digitally signed. The receiving device determines, on the basis of whether or not the comparison result indicates that the decrypted digital signature matches the summary information obtained from the information to be digitally signed, whether or not the transmitting device is valid. Those operations are described later in detail with reference to FIG. 20.

The summary information is hash information obtained by calculating the information (to be digitally signed) using a cryptographic one-way hash function. The summary information is also called a message digest since the information to be digitally signed can be compressed. The hash information generated using the cryptographic one-way hash function is unique information and can be generated only from the information to be digitally signed. The original information cannot be decrypted from the generated hash information.

Therefore, hash information is often used in order to encrypt information or generate a digital signature. Cryptographic one-way hash functions are algorithms such as Message Digest 5 (MD5), Secure Hash Algorithm-1 (SHA-1) and SHA-256, for example. Information on the type of an algorithm used to generate the summary information from the original information is described in the public key certificate.

The digital signature generating device 103 is a server that stores and accumulates information transmitted from the video image recording terminals 104 (described later) and performs a process of generating a digital signature. The video image recording terminals 104 each acquire and record video image information (or original data, hereinafter referred to as original video image information) to be digitally signed. The video image recording terminals 104 correspond to video cameras, commercial security cameras or the like. The video image recording terminals 104 are capable of communicating with the digital signature generating device 103. The video image recording terminals 104 and the digital signature generating device 103 may be each provided with a portable storage medium and communicate with each other via the portable storage media. In addition, the video image recording terminals 104 and the digital signature generating device 103 may communicate with each other via USB cables, IEEE1394 (i. LINK) or the like.

The video image extracting device 105 is a server that stores information transmitted from the digital signature generating device 103. The video image extracting device 105 is operated by the extracting terminal 106 (described later). A mouse, a keyboard, a display and the like may be connected directly to the video image extracting device 105, while the video image extracting device 105 may be operated by the mouse, the keyboard, the display and the like, for example.

The extracting terminal 106 is a terminal that operates the video image extracting device 105. The extracting terminal 106 is capable of communicating with the video image extracting device 105.

The digital signature verifying device 107 is a server that stores information transmitted from the video image extracting device 105 and verifies a digital signature added to the information transmitted from the video image extracting device 105. The digital signature verifying device 107 is operated by the verifying terminal 108 (described later). A mouse, a keyboard, a display and the like may be connected directly to the digital signature verifying device 107, while the digital signature verifying device 107 may be operated by the mouse, the keyboard, the display and the like, for example. The verifying terminal 108 is a terminal that operates the digital signature verifying device 107. The verifying terminal 108 is capable of communicating with the digital signature verifying device 107.

Figure 2:
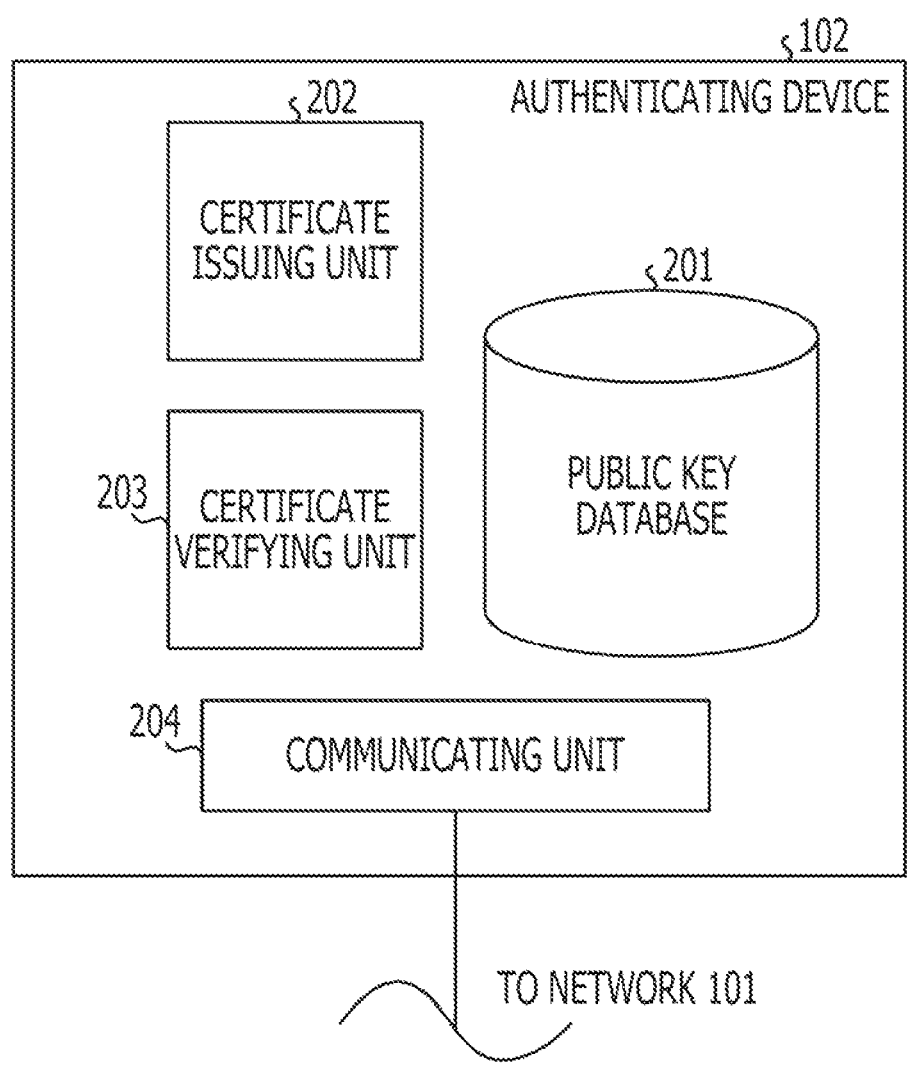
FIG. 2 is a block diagram illustrating the functional configuration of an authenticating device.

FIG. 2 is a block diagram illustrating the functional configuration of the authenticating device 102. The authenticating device 102 includes a public key database (DB) 201, a certificate issuing unit 202, a certificate verifying unit 203 and a communicating unit 204. A public key for the extracting terminal 106 and public keys for the video image recording terminals 104 are stored in the public key database 201. The certificate issuing unit 202 issues a public key certificate in response to a request. The certificate verifying unit 203 verifies a public key certificate. The communicating unit 204 is connected to the network 101 and performs communication via the network 101.

Figure 3:
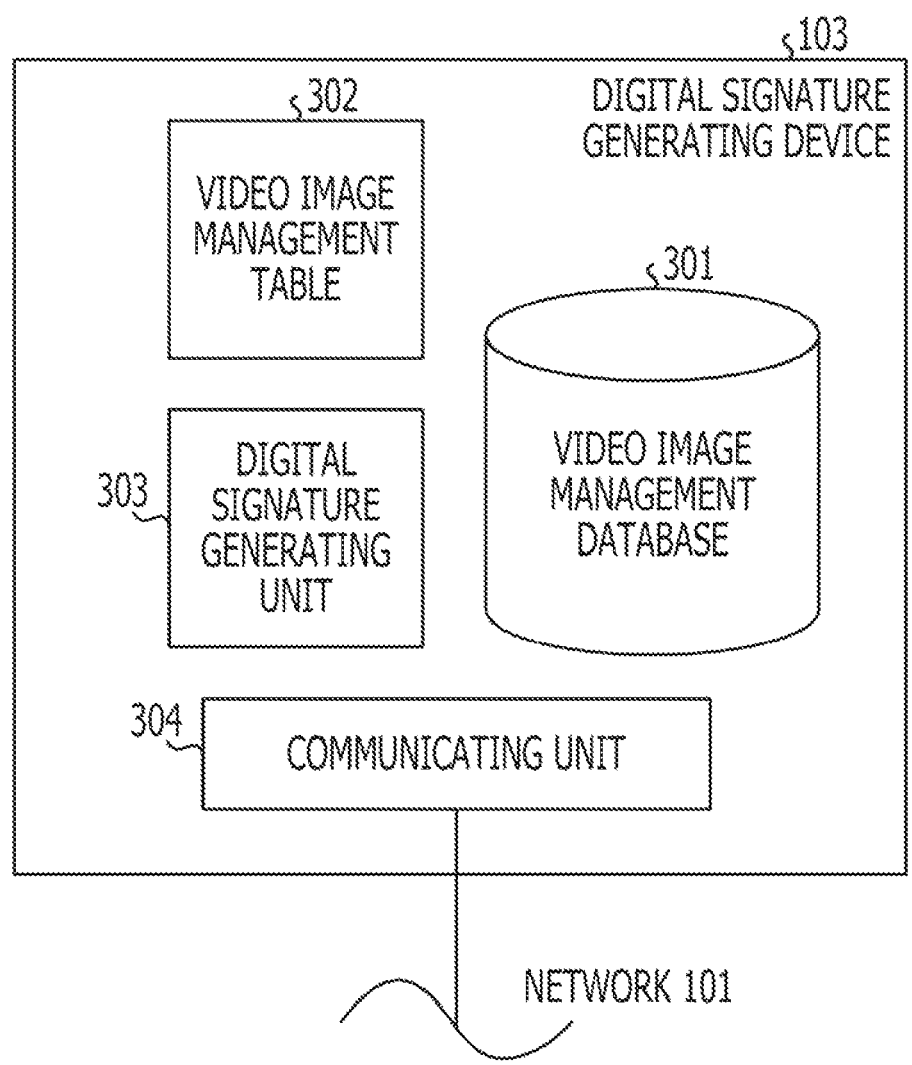
FIG. 3 is a block diagram illustrating the functional configuration of a digital signature generating device.

FIG. 3 is a block diagram illustrating the functional configuration of the digital signature generating device 103. The digital signature generating device 103 includes a video image management database (DB) 301, a video image management table (TB) 302, a digital signature generating unit 303 and a communicating unit 304. Information transmitted from the video image recording terminals 104 and information transmitted to the video image extracting device 105 are stored in the video image management database 301. The video image management table 302 manages and controls access to the video image management database 301. The digital signature generating unit 303 adds, to video image data, a digital signature and information to be digitally signed. The function of the digital signature generating unit 303 is described later with reference to FIG. 7. The communicating unit 304 is connected to the network 101 and performs communication via the network 101.

Figure 4:
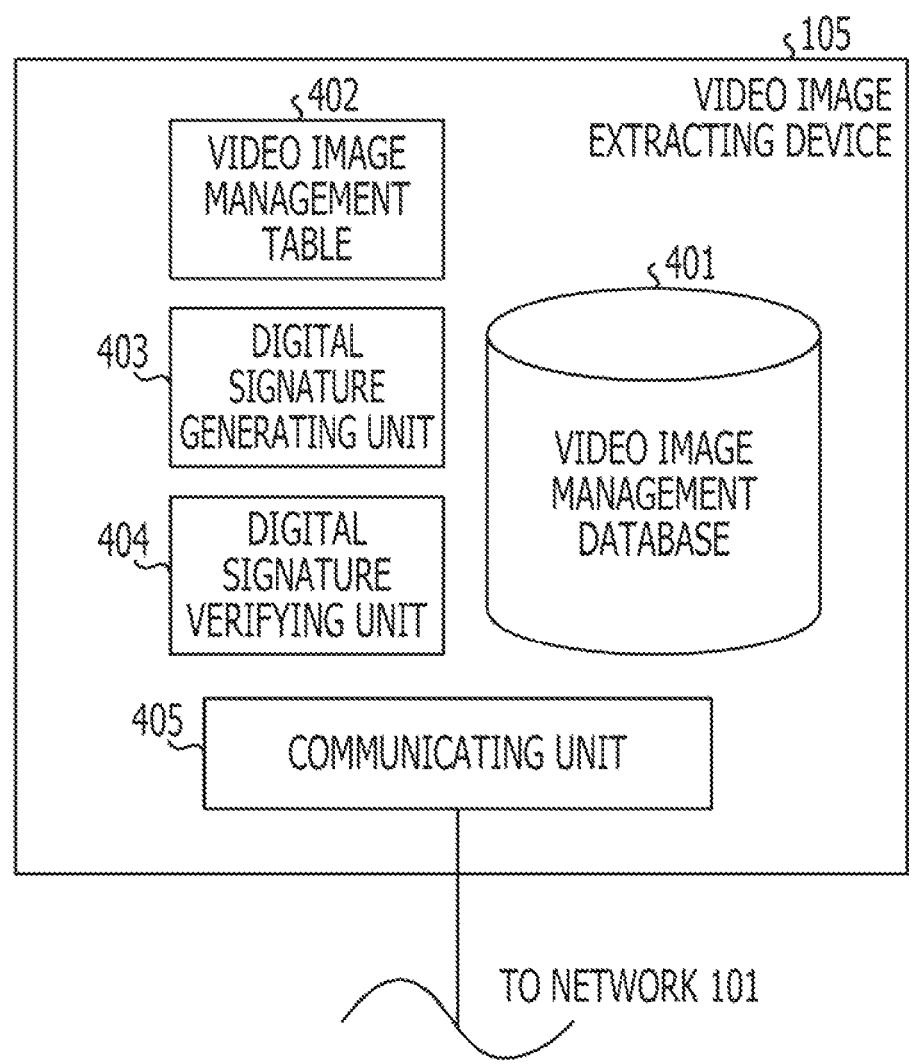
FIG. 4 is a block diagram illustrating the functional configuration of a video image extracting device.

FIG. 4 is a block diagram illustrating the functional configuration of the video image extracting device 105. The video image extracting device 105 includes a video image management database (DB) 401, a video image management table (TB) 402, a digital signature generating unit 403, a digital signature verifying unit 404 and a communicating unit 405. Information that has been transmitted from the digital signature generating device 103 is stored in the video image management database 401. The video image management table 402 manages and controls access to the video image management database 401. The digital signature generating unit 403 adds digital signature information to video image data. The digital signature verifying unit 404 verifies digital signature information added to the information transmitted from the digital signature generating device 103. The communicating unit 405 is connected to the network 101 and performs communication via the network 101.

Figure 5:
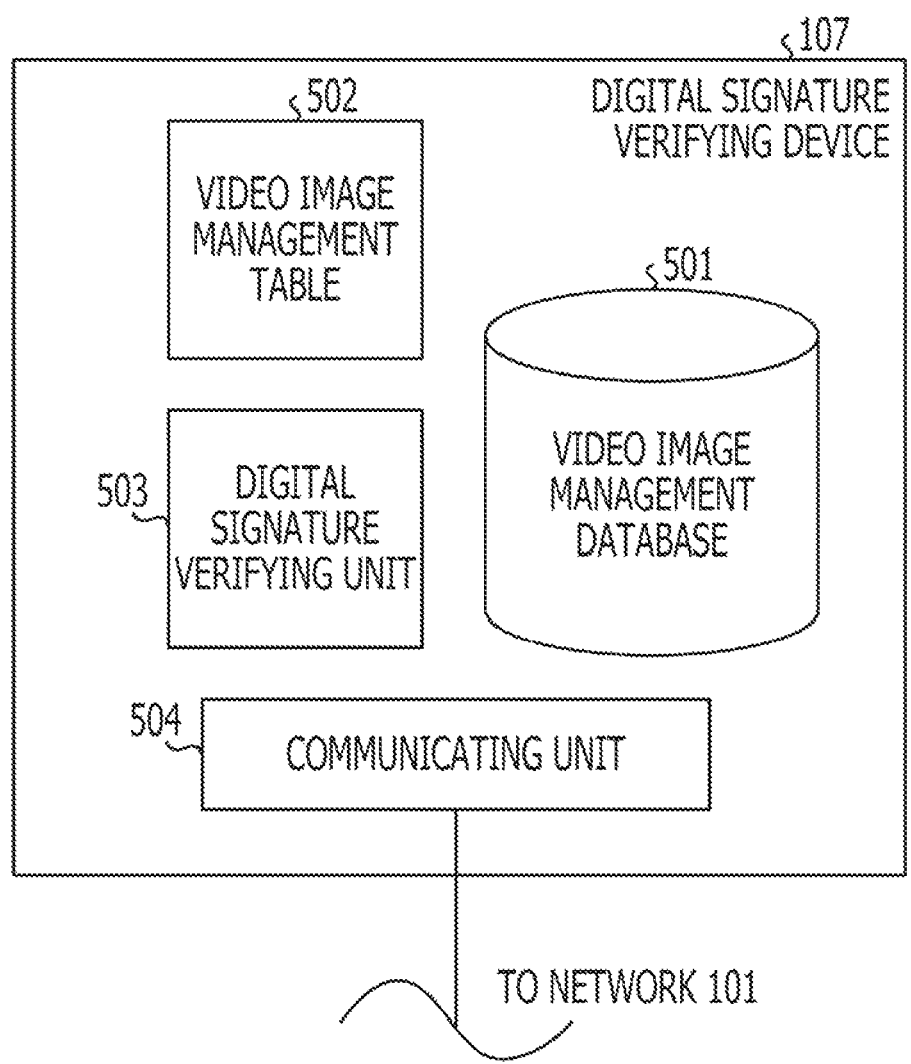
FIG. 5 is a block diagram illustrating the functional configuration of a digital signature verifying device.

FIG. 5 is a block diagram illustrating the functional configuration of the digital signature verifying device 107. The digital signature verifying device 107 includes a video image management database (DB) 501, a video image management table (TB) 502, a digital signature verifying unit 503 and a communicating unit 504. Information that has been transmitted from the video image extracting device 105 is stored in the video image management database 501. The video image management table 502 manages and controls access to the video image management database 501. The digital signature verifying unit 503 verifies digital signature information added to the information transmitted from the video image extracting device 105. The communicating unit 504 is connected to the network 101 and performs communication via the network 101.

As described above, the digital signature generating device 103 is connected to the network 101. However, the digital signature generating device 103 may be operated while being off line. Specifically, for example, a public key certificate that is generated by the authenticating device 102 is written in a removable medium such as a flexible disk, a compact disc or the like. Then, the authenticating device 103 reads the written public key certificate from a magnetic disk drive 604 (illustrated in FIG. 6 and described later) or an optical disc drive 606 (illustrated in FIG. 6 and described later).

In addition, the digital signature generating device 103 and the video image extracting device 105 may be operated in the following manner: a digital signature is generated for video image data; and the digital signature and the video image data are stored in a storage region included in the digital signature generating device 103; video image data and a digital signature are periodically written in the removable medium; and the video image extracting device 105 then reads the video image data and the digital signature from the removable medium.

Hardware configuration of digital signature generating device 103

Figure 6:
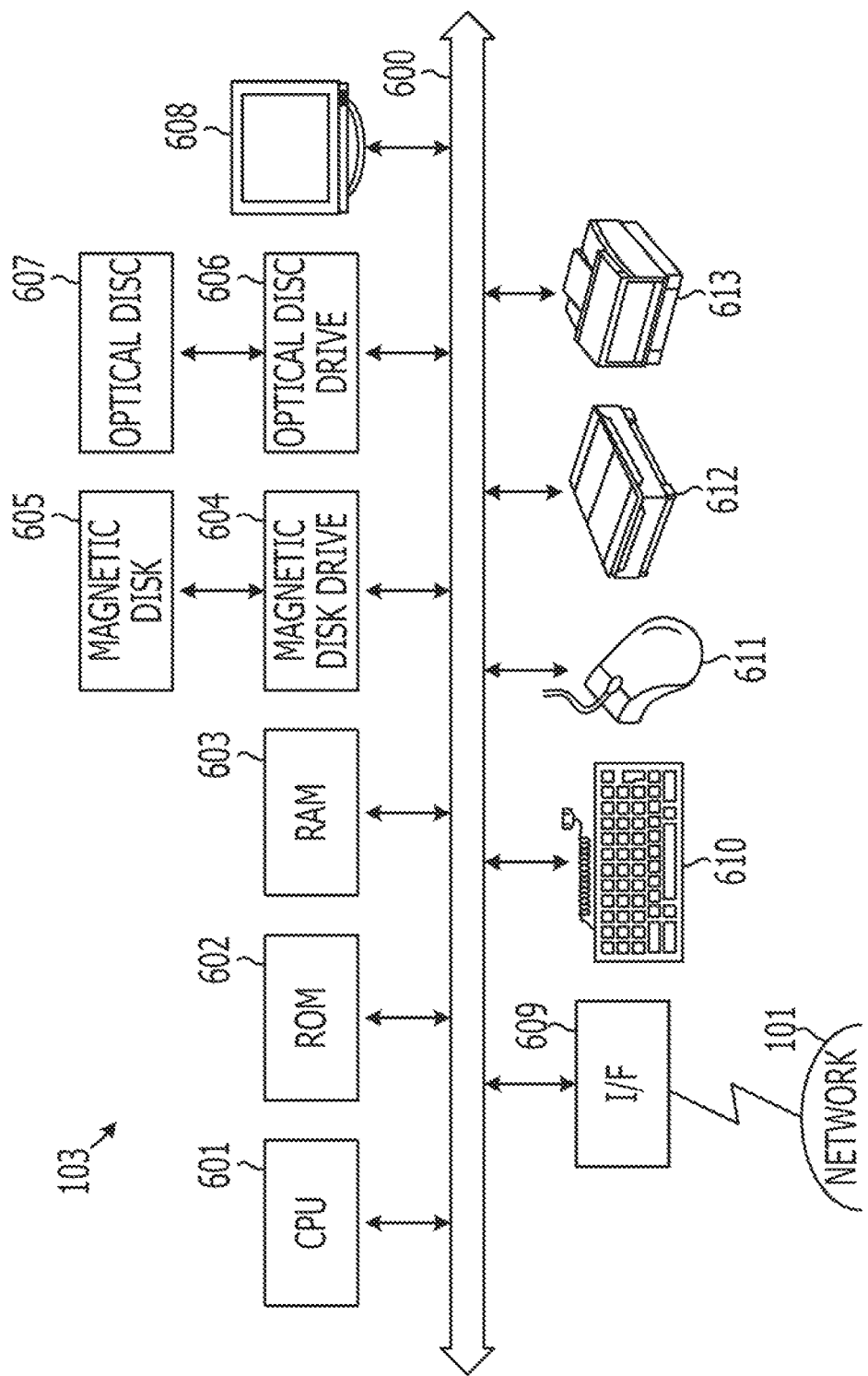
FIG. 6 is a block diagram illustrating the hardware configuration of the digital signature generating device.

FIG. 6 is a block diagram illustrating the hardware configuration of the digital signature generating device 103. As illustrated in FIG. 6, the digital signature generating device 103 includes a central processing unit (CPU) 601, a read-only memory (ROM) 602 and a random access memory (RAM) 603. The digital signature generating device 103 further includes the magnetic disk drive 604, a magnetic disk 605, the optical disc drive 606 and an optical disc 607. In addition, the digital signature generating device 103 further includes a display 608, an interface (I/F) 609, a keyboard 610, a mouse 611, a scanner 612 and a printer 613. The elements 601 to 613 of the digital signature generating device 103 are connected to each other through a bus 600.

The CPU 601 controls the entire digital signature generating device 103. A boot program and the like are stored in the ROM 602. The RAM 603 is used as a work area of the CPU 601. The magnetic disk drive 604 is controlled by the CPU 601 so as to control reading and writing of data from and in the magnetic disk 605. The data is written in the magnetic disk 605 on the basis of the control performed by the CPU 601 and is stored in the magnetic disk 605.

The optical disc drive 606 is controlled by the CPU 601 so as to control reading and writing of data from and in the optical disc 607. The data is written in the optical disc 607 on the basis of the control performed by the CPU 601 and is stored in the optical disc 607. A computer reads the data from the optical disc 607.

The display 608 displays data such as a cursor, icons, tool boxes, documents, images and functional information, for example. A CRT, a TFT liquid crystal display, a plasma display and the like can be used as the display 608.

The interface 609 is connected to the network 101. The interface 609 is connected to other devices via the network 101. The interface 609 connects the network 101 to the elements 601 to 613 of the digital signature generating device 103 and controls inputting and outputting of data to and from an external device. A modem, a LAN adapter and the like can be used as the interface 609.

The keyboard 610 has keys to input characters, numbers, various instructions and the like and is used to enter data. The keyboard 610 may be replaced with a touch panel type input pad, a numeric keypad or the like. The mouse 611 is used to move the cursor, select a range, move a window, change the size of the window, and the like. The mouse 611 may be replaced with a trackball, a joystick or the like as long as the trackball, the joystick or the like functions as a pointing device in a similar manner to the mouse 611.

The scanner 612 optically reads an image and acquires data on the image so that the digital signature generating device 103 receives the data on the image. The scanner 612 may have an optical character reading (OCR) function. The printer 613 prints image data and document data. A laser printer and an ink jet printer can be used as the printer 613.

The hardware configuration of the digital signature verifying device 107 is substantially the same as or similar to the hardware configuration of the digital signature generating device 103. Specifically, the digital signature verifying device 107 includes a CPU, a ROM, a RAM, a magnetic disk drive, a magnetic disk, an optical disc drive, an optical disc, a display, an interface, a keyboard, a mouse, a scanner and a printer.

Figure 7:
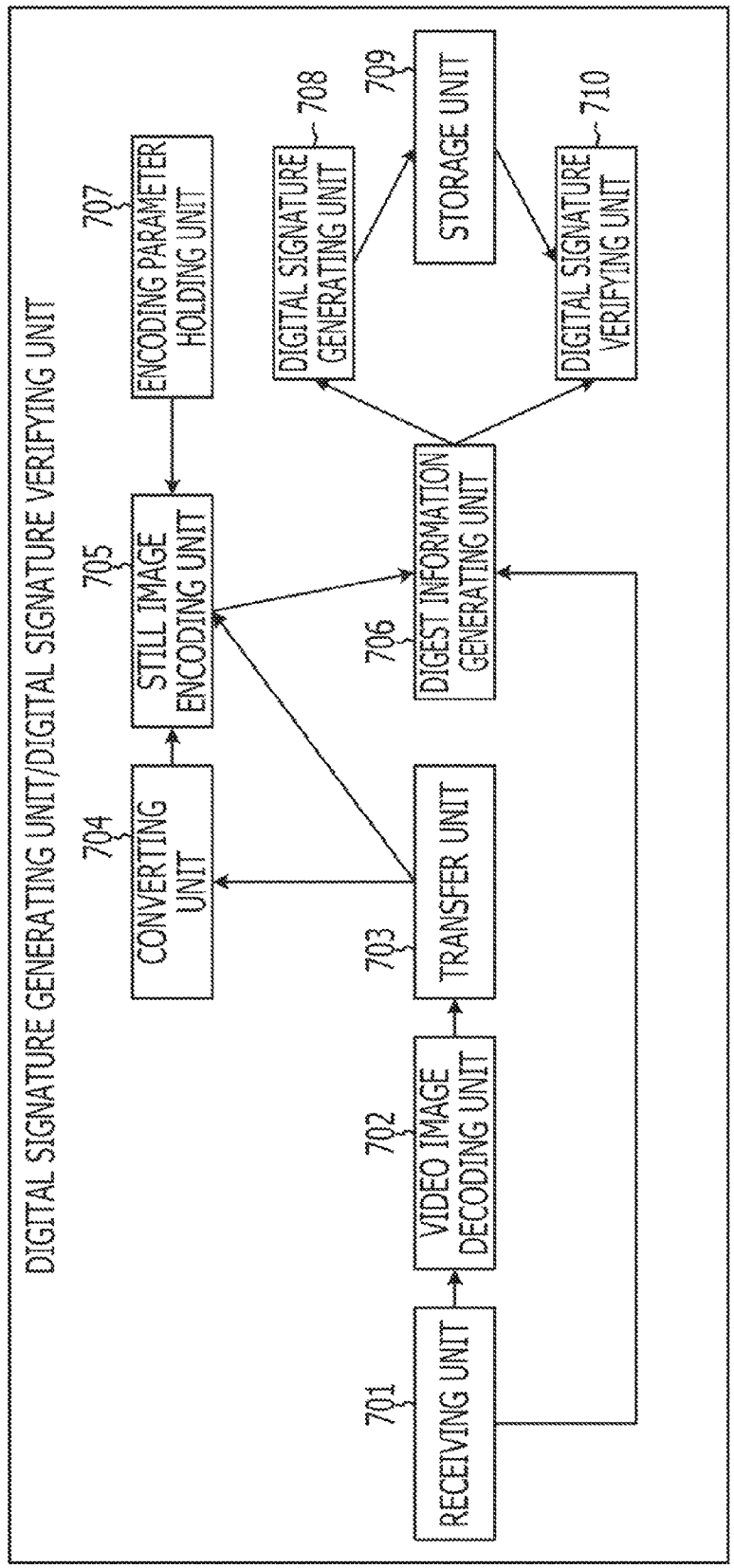
FIG. 7 is a block diagram illustrating the functional configuration of a digital signature generating unit and the functional configuration of a digital signature verifying unit.

FIG. 7 is a block diagram illustrating the functional configuration of the digital signature generating unit 303 and the functional configuration of the digital signature verifying unit 503. The functional configuration of the digital signature generating unit 303 is substantially similar to the functional configuration of the digital signature verifying unit 503. Thus, the functional configuration of the digital signature generating unit 303 is described together with the functional configuration of the digital signature verifying unit 503. The digital signature generating unit 303 includes a receiving unit 701, a video image decoding unit 702, a transfer unit 703, a converting unit 704, a still image encoding unit 705, a digest information generating unit 706, a digital signature generating unit 708 and a storage unit 709. The digital signature verifying unit 503 includes the units 701, 702, 703, 704, 705, 706, 709 and a digital signature verifying unit 710 instead of the digital signature generating unit 708. The digital signature generating unit 303 and the digital signature verifying unit 503 may each include an encoding parameter holding unit 707.

Functions of the units 701 to 710 are each achieved by causing the CPU 601 to execute a program stored in a storage device such as the ROM 602, the RAM 603, the magnetic disk 605, the optical disc 607 or the like. The functions of the units 701 to 710 may be each achieved by causing another CPU to execute the program via the interface 609.

The receiving unit 701 has a function of receiving information. Specifically, for example, the receiving unit 701 of the digital signature generating unit 303 receives original video image information. The receiving unit 701 of the digital signature verifying unit 503 receives extracted still image information from the verifying terminal 108. The received information is stored in a storage region such as the RAM 603, the magnetic disk 605, the optical disc 607 or the like.

The video image decoding unit 702 has a function of analyzing video image data and acquiring frames from the video image data on a frame basis. The frames are predicted frames and video image frames. The predicted frames cannot be replayed independently, while the video image frames can be replayed independently. For example, for MPEG format, the video image decoding unit 702 analyzes video image data by an MPEG decoder and acquires frames from the video image data on a frame basis. In the data in MPEG format, each of predicted frames is a P picture or a B picture, while video image frames that can be replayed independently are I pictures. Data in video image formats such as MPEG-1, MPEG-2 and H.264/AVC can be used as the video image data. The frames decoded by the video image decoding unit 702 are stored in a storage region such as the RAM 603, the magnetic disk 605 or the optical disc 607.

The transfer unit 703 has a function of transferring, when receiving a predicted frame, the predicted frame to the converting unit 704 and transferring, when receiving a first or second video image frame, the video image frame to the still image encoding unit 705. The two types of video image frames are present. The first video image frame is originally present in the video image data. The second video image frame is obtained by causing the converting unit 704 to convert the predicted frame so that the second video image frame can be independently replayed. For example, for MPEG format, I pictures are transferred to the still image encoding unit 705, and video image frames that have been obtained by causing the converting unit 704 to convert P and B pictures (that are predicted frames) and can be independently replayed are transferred to the still image encoding unit 705. The transferred data are stored in a storage region such as the RAM 603, the magnetic disk 605 or the optical disc 607.

The converting unit 704 has a function of converting, on the basis of the first video image frame that can be independently replayed, the predicted frames that cannot be independently replayed into the second video image frames that can be independently replayed. For example, the converting unit 704 converts, on the basis of an I picture (that can be independently replayed) of data in MPEG format, P and B pictures (predicted frames) of the data in MPEG format into independently replayable video image frames. In this case, each of P pictures is converted on the basis of an I or P picture that precedes the P picture. Each of the B pictures is converted on the basis of an I or P picture preceding the B picture and of an I or P picture succeeding the B picture. The converted frames are stored in a storage region such as the RAM 603, the magnetic disk 605, the optical disc 607 or the like.

The still image encoding unit 705 has a function of encoding the first or second video image frame into an image data on the basis of the image format. Specifically, for example, the still image encoding unit 705 encodes, into still images on the basis of the image format, a frame (that is an I picture of data in MPEG format) and video image frames obtained by converting P and B pictures of the data in MPEG format. As the image format, JPEG format, JPEG 2000 format, Portable Network Graphic (PNG) format, Graphics Interchange Format (GIF) and the like can be used. The encoded still images are stored in a storage region such as the RAM 603, the magnetic disk 605, the optical disc 607 or the like.

The digest information generating unit 706 has a function of generating summary information (synonymous with digest information) for each of image data encoded by the still image encoding unit 705. In addition, when the receiving unit 701 of the digital signature verifying unit 503 receives encoded image data, the digest information generating unit 706 may generate summary information for the received image data.

Specifically, for example, the digest information generating unit 706 generates digest information on the basis of still images encoded in JPEG format. In this case, the digest information generating unit 706 generates a digest information for each of frames included in video image data. The generated digest information are stored in a storage region such as the RAM 603, the magnetic disk 605, the optical disc 607 or the like.

The encoding parameter holding unit 707 has a function of holding at least one parameter that is related to encoding of data into a still image in order for the still image encoding unit 705 to encode the data into the still image. For example, the parameter is information that is necessary to encode the data into JPEG format. Specifically, for example, the parameter is a compression rate, a quality level, a color depth, luminance or the like. The compression rate and the quality level may affect the quality of an image, while the color depth and the luminance may affect the color and brightness of the image. The encoding parameter holding unit 707 holds such a value as the parameter and uses the parameter in order to encode the data into the still image. The parameter is stored in a storage region such as the RAM 603, the magnetic disk 605, the optical disc 607 or the like.

The digital signature generating unit 708 has a function of generating a digital signature for information that is to be digitally signed and includes the digest information generated by the digest information generating unit 706. The information to be digitally signed, which includes the digest information, may include the parameter held by the encoding parameter holding unit 707. Specifically, for example, the digital signature generating unit 708 generates a digital signature for a group of digest information that have been generated for a number n of frames, respectively. The generated digital signature is stored in a storage region such as the RAM 603, the magnetic disk 605, the optical disc 607 or the like.

The storage unit 709 has a function of storing the digital signature generated by the digital signature generating unit 708 and the information to be digitally signed. The original video image information received by the receiving unit 701 may be stored in the storage unit 709. Regions in which the digital signature, the information to be digitally signed and the like are stored are the video image management database 301, the video image management database 501, and the like. The video image management database 301 is located in a storage region such as the RAM 603, the magnetic disk 605, the optical disc 607 or the like of the digital signature generating device 103. The video image management database 501 is located in a storage region such as the RAM 603, the magnetic disk 605, the optical disc 607 or the like of the digital signature verifying device 107. The digital signature, the information to be digitally signed and the like may be stored in a storage region other than the digital signature generating device 103 and the digital signature verifying device 107.

The digital signature verifying unit 710 has a function of verifying the validity of image data (to be verified) using a group of the summary information generated by the digest information generating unit 706. In addition, the digital signature verifying unit 710 has a function of confirming the validity of a digital signature. The group of generated summary information is a group of digest information generated when video image data is generated, for example. The generated summary information are summary information generated from the video image data that is not altered. When the video image recording terminals 104 and the digital signature generating device 103 cannot occasionally communicate with each other and the digital signature generating unit 103 receives video image data, the digest information generating unit 706 generates digest information and the digital signature verifying unit 710 treats the generated digest information as a group of generated summary information.

When the encoding parameter holding unit 707 has parameters, the digital signature verifying unit 710 may verify the validity of image data (to be verified) using summary information generated on the basis of a group of the parameters. When the parameter group used for the generated summary information matches a parameter group used for digest information generated on the basis of still images to be verified, still images that are generated in a process of generating a digital signature are the same as still images that are generated in a process of verifying the digital signature.

Specifically, for example, the digital signature verifying unit 503 performs a verifying process by comparing a digest information generated on the basis of a still image (to be verified) with a group of a number n of digest information generated from video image data that includes a number n of frames. Then, the digital signature verifying unit 503 confirms whether or not a frame of the still image (to be verified) matches any of frames that are included in the video image data. When the frame of the still image (to be verified) matches any of the frames that are included in the video image data, it is possible to ensure the validity of the image data. The verification result is stored in a storage region such as the RAM 603, the magnetic disk 605, the optical disc 607 or the like.

The digital signature generating unit 403 that is included in the video image extracting device 105 has substantially the same functions as the digital signature generating unit 303. In addition, the digital signature verifying unit 404 that is included in the video image extracting device 105 has substantially the same functions as the digital signature verifying unit 503.

Figure 8:
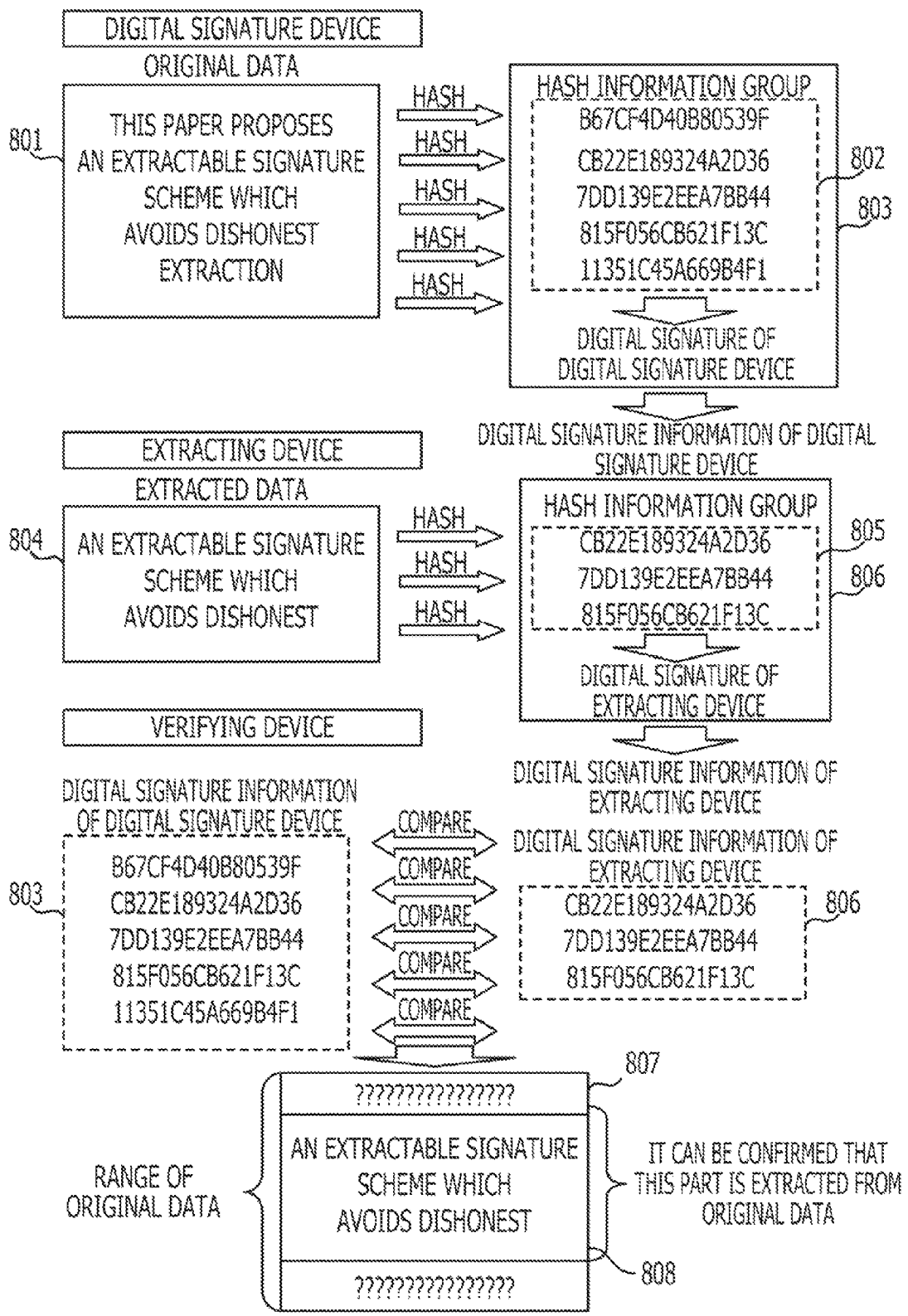
FIG. 8 is a diagram illustrating the outline of a digital signature algorithm.

FIG. 8 is a diagram illustrating the outline of a digital signature algorithm. The digital signature device divides original data 801 into partial data, calculates a hash group of the partial data, and generates a hash information group 802. The generated hash information group 802 is information to be digitally signed. The hash information group 802 is digitally signed by the digital signature device to form a digital signature. The hash information group 802 and the digital signature comprise digital signature information 803 of the digital signature device.

The extracting device extracts a partial data from the data digitally signed by the digital signature device so as to generate extracted data 804. After that, the extracting device performs the same operation as the digital signature device. Specifically, the extracting device generates a hash information group 805 from the extracted data 804. The hash information group 805 is digitally signed by the extracting device to form a digital signature. The hash information group 805 and the digital signature constitute digital signature information 806 of the extracting device.

The verifying device verifies the completeness of the hash information group 802 by the digital signature (of the digital signature device) included in the digital signature information 803 of the digital signature device. In addition, the verifying device verifies the completeness of the hash information group 805 by the digital signature (of the extracting device) included in the digital signature information 806 of the extracting device. Next, the verifying device generates a hash information group from the disclosed partial data and verifies that the generated hash information group matches the hash information group 805. Lastly, the verifying device compares the hash information group 802 generated by the digital signature device with the hash information group 805 of the data extracted by the extracting device. It is apparent from the comparison that a range 808 of the hash information group of the data extracted by the extracting device is included in a range 807 of the original data 801. If the hash information of the extracted data 804 is not included in the hash information of the original data 801, the partial data is an altered data.

Figure 9:
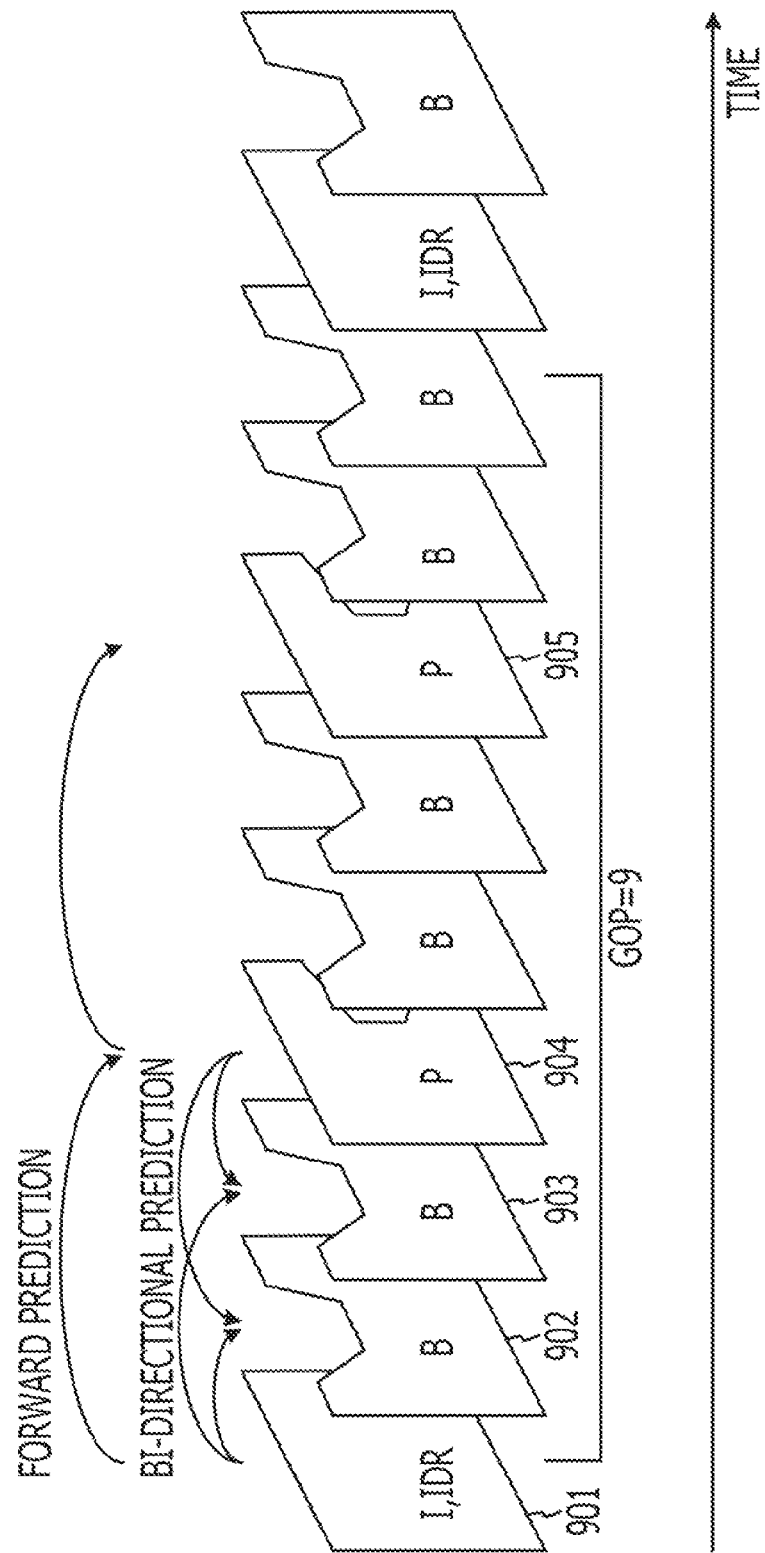
FIG. 9 is a diagram illustrating an example of types of images of compressed video image data and the arrangement of the images.

FIG. 9 is a diagram illustrating an example of types of images included in compressed video image data and the arrangement of the images. Frames that comprise the compressed video image data are mainly classified into a video image frame that can be independently replayed, and predicted frames that each include data on a difference from the video image frame. The predicted frames cannot be replayed independently.

According to the MPEG standard, the video image frame that can be independently replayed is called an I picture, while the predicted frames are called P and B pictures. I pictures include all compressed image data that is necessary to be displayed. The I pictures each include an instantaneous decoding refresh picture that has been newly added to the H.264/AVC standard. In the following description, an I picture and an IDR picture are simply regarded as an I picture. Characteristics of the pictures are described later. In FIG. 9, the I picture is a frame 901. In addition, the P pictures are frames 904 and 905, and the B pictures are frames 902 and 903 in FIG. 9.

The P and B pictures are also called inter-frame predicted images. The P pictures are each obtained by referencing an image included in an I or P picture that immediately precedes the P picture and has been decoded. The P pictures each have information (predicted difference information) on a predicted difference from the referenced picture that precedes the P picture. For example, the converting unit 704 converts the frame 904 into an independently replayable frame by referencing an image included in the frame 901 (I picture). In addition, for example, the converting unit 704 converts the frame 905 into an independently replayable frame by referencing an image included in the frame 904 (P picture).

In this manner, the converting unit 704 performs forward inter-frame prediction by referencing a frame preceding a P picture so as to convert the P picture into an independently replayable frame. In order to perform the forward inter-frame prediction on a certain P picture, the following frame is referenced: a frame that is an I or P picture that immediately precedes the certain P picture. When the compressed video image data is data in H.264/AVC format, a frame that precedes the I or P picture immediately preceding the certain P picture can be referenced in order to perform the forward inter-frame prediction on the certain P picture.

The B pictures are each obtained by referencing an image included in an I or P picture that immediately precedes the B picture and has been decoded and referencing an image included in an I or P picture that immediately succeeds the B picture and has been decoded. The B pictures each have information (predicted difference information) on a predicted difference from the referenced pictures. For example, the converting unit 704 converts the frame 902 into an independently replayable frame by referencing an image included in the frame 901 (I picture) and an image included in the frame 904 (P picture). The same applies to the frame 903.

In this manner, the converting unit 704 performs bi-directional prediction by referencing frames (preceding and succeeding a B picture) so as to convert the B picture into an independently replayable frame. In order to perform the bi-directional prediction on a certain B picture, the following frames are referenced: a frame that is an I or P picture that immediately precedes the certain B picture and a frame that is an I or P picture that succeeds the certain B picture. When the compressed video image data is data in H.264/AVC format, the following frames can be referenced in order to perform the bi-directional prediction on the certain B picture: a frame (preceding an I or P picture that immediately precedes the certain B picture); and a frame (succeeding an I or P picture that immediately succeeds the certain B picture).

Thus, a duplicated portion of the referenced frame and the P picture, which is not changed with respect to time, can be removed by acquiring the difference between the referenced frame (preceding the P picture) and the P picture, while a duplicated portion of the referenced frames and the B picture, which is not changed with respect to time, can be removed by acquiring the difference between the referenced frames (preceding and succeeding the B picture) and the B picture. Therefore, the video image data is compressed at a high compression rate. As illustrated in FIG. 9, some images are grouped as the minimum unit (called a group of pictures (GOP)) of a video image. In the example illustrated in FIG. 9, the number of the GOP is 9. Each GOP can be independently replayed on a GOP basis. The GOP is a structure that allows a middle portion of the video image to be edited and start to be replayed.

A function of the IDR picture is described below. As described above, for data in H.264/AVC, a certain P picture is obtained by referencing a frame that precedes an I or P picture immediately preceding the certain P picture, while a certain B picture is obtained by referencing a frame that precedes an I or P picture immediately preceding the certain B picture and referencing a frame that succeeds an I or P picture immediately succeeding the certain B picture. Thus, it is not always ensured that the video image starts to be replayed from an I picture. To avoid this problem, IDR pictures are provided. When the video image decoding unit 702 receives an IDR picture, the video image decoding unit 702 clears a buffer in which reference frames are stored. Thus, it is ensured that the video image starts to be replayed from an IDR picture. Since the reference frames are cleared, the P picture is not obtained by referencing a frame that precedes an IDR picture preceding the P picture. In addition, the B picture is not obtained by referencing a frame that precedes an IDR picture preceding the B picture. Furthermore, the B picture is not obtained by referencing a frame that succeeds an IDR picture succeeding the B picture.

Figure 10:
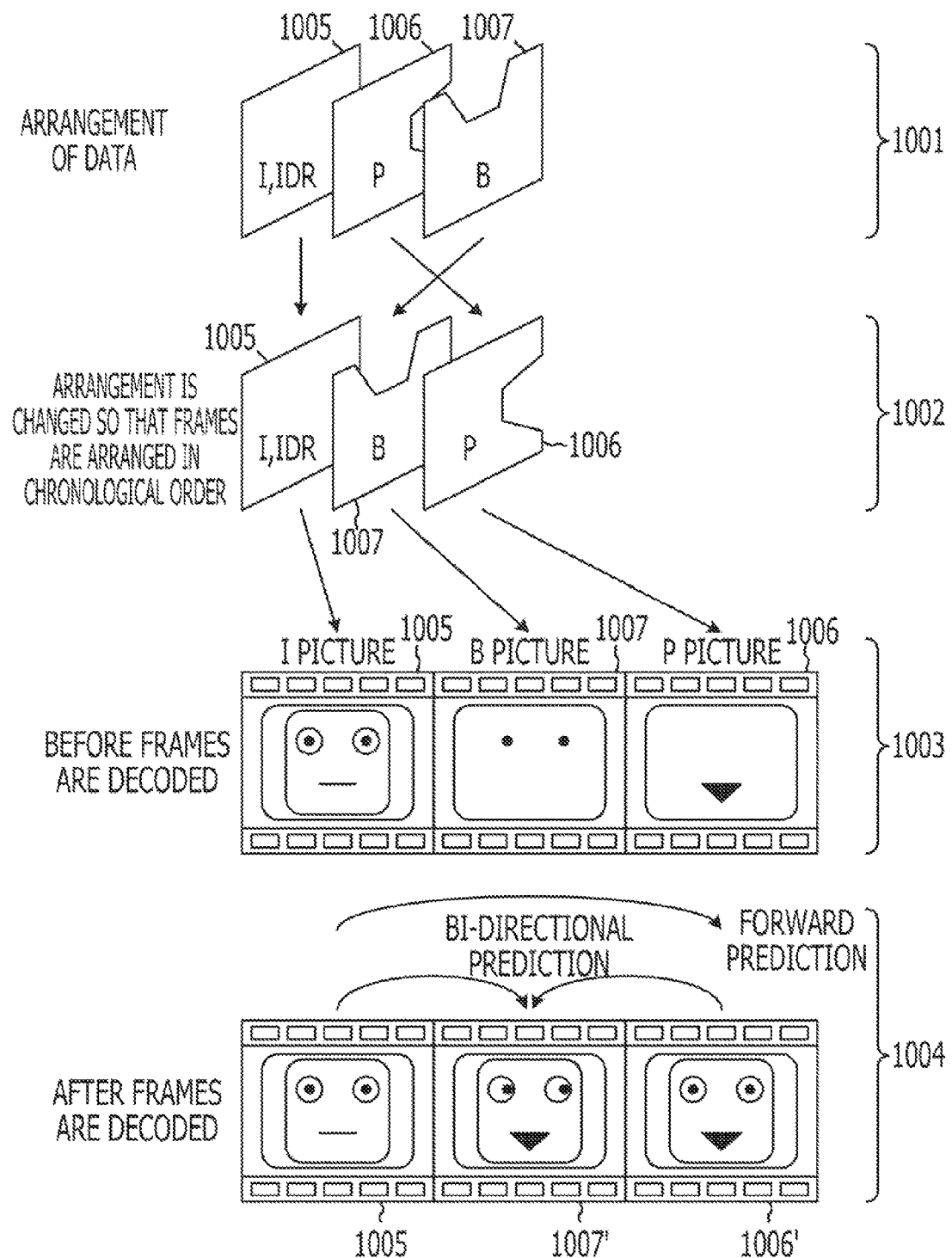
FIG. 10 is a diagram illustrating an example in which P and B pictures of compressed video image data are converted into independent images.

FIG. 10 is a diagram illustrating an example of conversion of P and B pictures (included in compressed video image data) into independent images. As illustrated by reference numeral 1001, the compressed video image data includes frames that are to be referenced and is arranged in order of the frames. The video image decoding unit 702 analyzes the compressed video image data for each of the frames 1005, 1006 and 1007. As a specific example of the analysis, data in MPEG format is entropy coded by discrete cosine transform (DCT), and the video image decoding unit 702 performs inverse DCT so as to decode the encoded data and analyzes the data for each of frames.

In the example illustrated in FIG. 10, the frame 1005 is an I picture, the frame 1006 is a P picture, and the frame 1007 is a B picture. Subsequently, the video image decoding unit 702 changes the order of the frames 1005 to 1007 so that the frames 1005, 1007 and 1006 are arranged in chronological order (illustrated by reference numeral 1002).

Next, the conversion of the P and B pictures into independent images is described. Reference numeral 1003 indicates the video image information in which the frames are yet to be decoded. The video image information illustrated by reference numeral 1003 has an image included in the frame 1005 and predicted difference information included in the frames 1007 and 1006. The frame 1005 that is the I picture includes all the image data. The frame 1006 that is the P picture includes the information (predicted difference information) on the difference from the frame 1005. In addition, the frame 1007 that is the B picture includes the information (predicted difference information) on the difference from the frame 1005. Reference numeral 1004 indicates the video image information in which the frames have been decoded so as to form video image frames. The converting unit 704 converts the frames 1006 and 1007 into video image frames 1006' and 1007' that can be independently replayed.

Specifically, the converting unit 704 writes the frame 1006 (that includes the difference) over the frame 1005 so as to generate the video image frame 1006'. In a similar manner, the converting unit 704 writes the frame 1007 (that includes the difference) over the frames 1005 and 1006 so as to generate the video image frame 1007'.

The P and B pictures each include the predicted difference information and motion compensation information. The motion compensation information indicates the distance of the movement of an image portion from a reference picture or an I or P picture in a specific range. In the example illustrated in FIG. 10, the frames are decoded to form the video image frames after the frames are acquired in chronological order for convenience of the explanation. However, the frames may be acquired in chronological order after the frames are decoded to form the video image frames.

Figure 11:
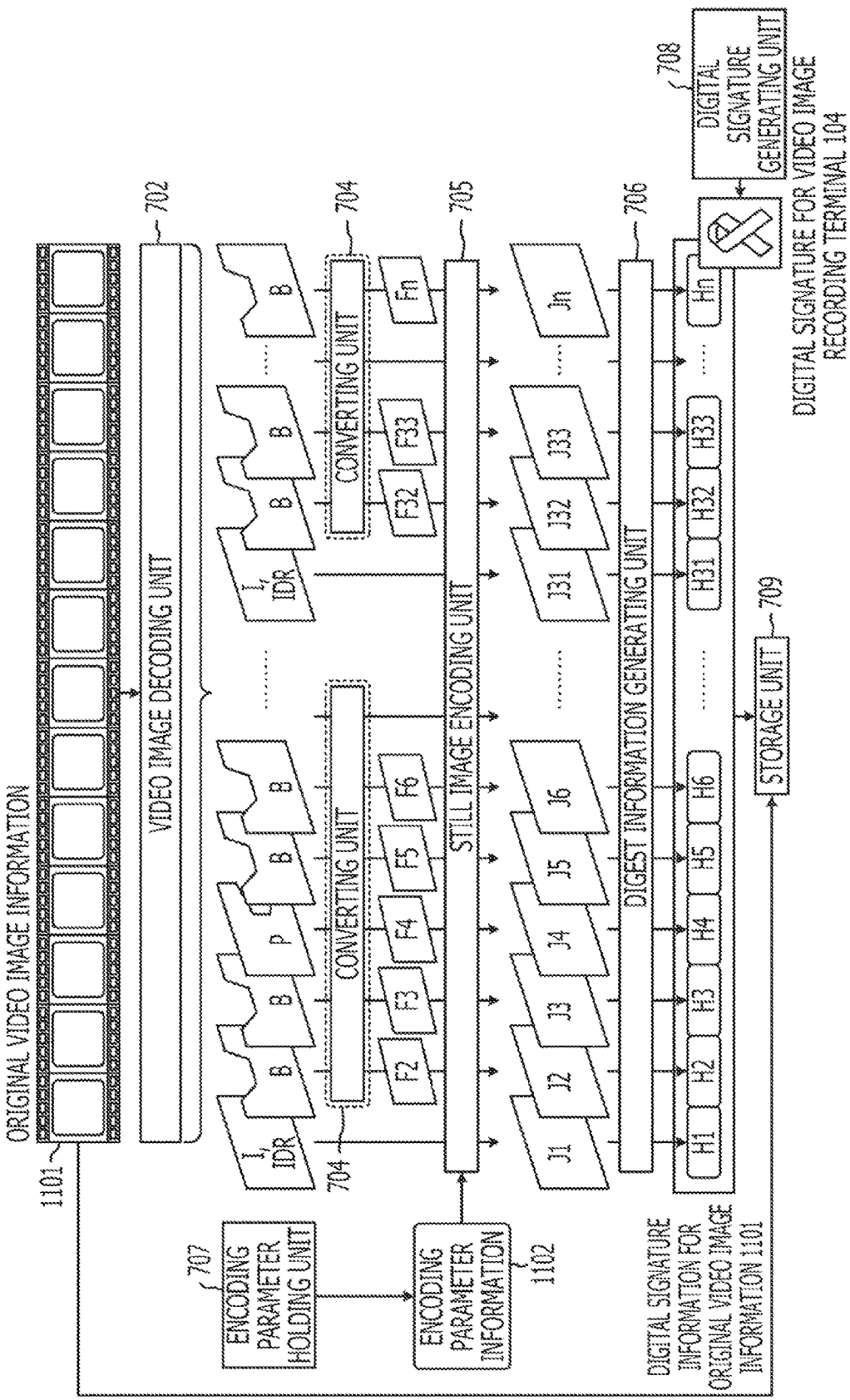
FIG. 11 is a diagram illustrating the outline of a process of generating a digital signature for original video image information.

FIG. 11 is a diagram illustrating the outline of a process of generating a digital signature for original video image information. The digital signature generating unit 303 receives original video image information 1101. Then, the video image decoding unit 702 analyzes the original video image information 1101 for each of frames included in the original video image information 1101 and arranges the frames in chronological order. The original video image information 1101 is stored in the storage unit 709. The transfer unit 706 transfers, to the converting unit 704, P and B pictures that are frames included in the original video image information 1101. The transfer unit 706 transfers, to the still image encoding unit 705, I and IDR pictures that are the other frames included in the original video image information 1101.

The frames that are transferred to the converting unit 704 are converted into independently replayable video image frames by the converting unit 704. The independently replayable video image frames are indicated by F2, F3, ..., Fn. The method for the conversion is described above with reference to FIG. 10. The format of the independently replayable video image frames may be substantially the same as the IDR pictures or may be based on an uncompressed image format.

Next, in the digital signature generating device 103, the still image encoding unit 705 encodes the video image frames converted by the converting unit 704 and the video image frames (that are I and IDR pictures) transferred from the transfer unit 703 so as to generate still images. The generated still images are indicated by J1, J2, J3, ..., Jn. The still image encoding unit 705 may acquires encoding parameter information 1102 from the encoding parameter holding unit 707, reference a parameter value included in the encoding parameter information 1102, and encode the frames on the basis of the parameter value.

The reason that the parameter information is acquired is as follows. Any of the images is extracted as a still image from the original video image information, and it is necessary to ensure that the extracted still image is a part of the original video image information and is not altered. Thus, the same encoding scheme may be used to encode frames on the basis of the image format.

Specifically, for example, in order to encode video image frames into JPEG format that is an image format, different encoding schemes may be used to encode the video image frames depending on software or a tool, which is used to encode the video image frames. When different encoding schemes are used, digital data that is different from original data may be generated while the naked eye cannot distinguish the difference between the generated digital data and the original data. This effect can be substantially prevented when the same encoding scheme is used for the process of generating a digital signature and the process of verifying the digital signature.

As described in the explanation of the encoding parameter holding unit 707 illustrated in FIG. 7, the information that is necessary to encode data into JPEG format includes a compression rate, a quality level, a color depth and luminance. The compression rate and the quality level may affect the quality of an image, while the color depth and the luminance may affect the color and brightness of the image. The information is predetermined, pre-stored in the digital signature generating device 103, and acquired when necessary. As parameters other than the aforementioned parameters, the digital signature generating device 103 may includes settings for progressive JPEG format and settings for non-progressive JPEG format. The digital signature generating device 103 may includes, as parameters, settings and the like for floating-point arithmetic, high-precision integer arithmetic, or high-speed integer arithmetic. The floating-point arithmetic, the high-precision integer arithmetic, or the high-speed integer arithmetic is used for DCT that is performed to encode data into JPEG format.

The digital signature generating device 103 may includes the parameters for each of pieces of original video image information. It is assumed that original video image information includes a video image of a scene in which a bridge is inspected. In this assumption, when the video image is recorded at a shadowy location while the brightness is close to 0%, and the still image encoding unit 705 encodes frames included in the original video image information so that the brightness is set to a value close to 100%, encoded still images can be easily viewed. In this manner, the digital signature generating device 103 may include the parameters for each of files so that a specific parameter setting is used for original video image information obtained under a specific condition and a normal parameter setting is used for other original video image information.

In the above description, JPEG format is used as an example. The still image encoding unit 705 (illustrated in FIG. 7) may use another still image format as described above. The digital signature generating device 103 may include parameters for each of formats, and the still image encoding unit 705 may perform encoding on the basis of each of the formats.

In the digital signature generating device 103, the digest information generating unit 706 generates a digest information piece for each of still images encoded by the still image encoding unit 705. Specifically, the digital signature generating device 103 generates a digest information H1, a digest information H2, ..., a digest information Hn. The digital signature generating unit 708 generates a digital signature for a group of the generated digest information. The digest information and the digital signature comprise digital signature information. The generated digital signature information is stored in the storage unit 709.

In order to reliably ensure the originality of the video image information, the digest information and the encoding parameter information used by the still image encoding unit 705 may be regarded as information to be digitally signed, and the digital signature generating unit 708 may generate a digital signature for the information to be digitally signed.

A one-way hash function can be used to generate the digest information, while Rivest Shamir Adleman (RSA) that is an algorithm for public-key cryptography can be used to generate the digital signature. The one-way hash function is any of algorithms such as MD5, SHA-1 and SHA-256, for example. For example, when SHA-256 is used, digest information of 265 bits (32 bytes) is generated for one message.

When video image data that is replayed at a rate of 30 frames per second (fps) is recorded for approximately one hour, 108,000 (30 fps×60 seconds×60 minutes) frames are stored, for example. In this case, when the SHA-256 algorithm is used, the amount of the video image data is 108,000× 32 bytes (≅3.5 megabytes). The digital signature information includes the information of approximately 3.5 megabytes and information on the digital signature generated using RSA. Thus, the data amount of the digital signature information is approximately 4 megabytes. Thus, it is possible to ensure the originality of video image information while information with a small amount is stored compared with the video image information.

The process of generating the digital signature for the original video image information is performed by the aforementioned operations. The process illustrated in FIG. 11 is described later in detail with reference to FIGS. 22 and 23.

Figure 12:
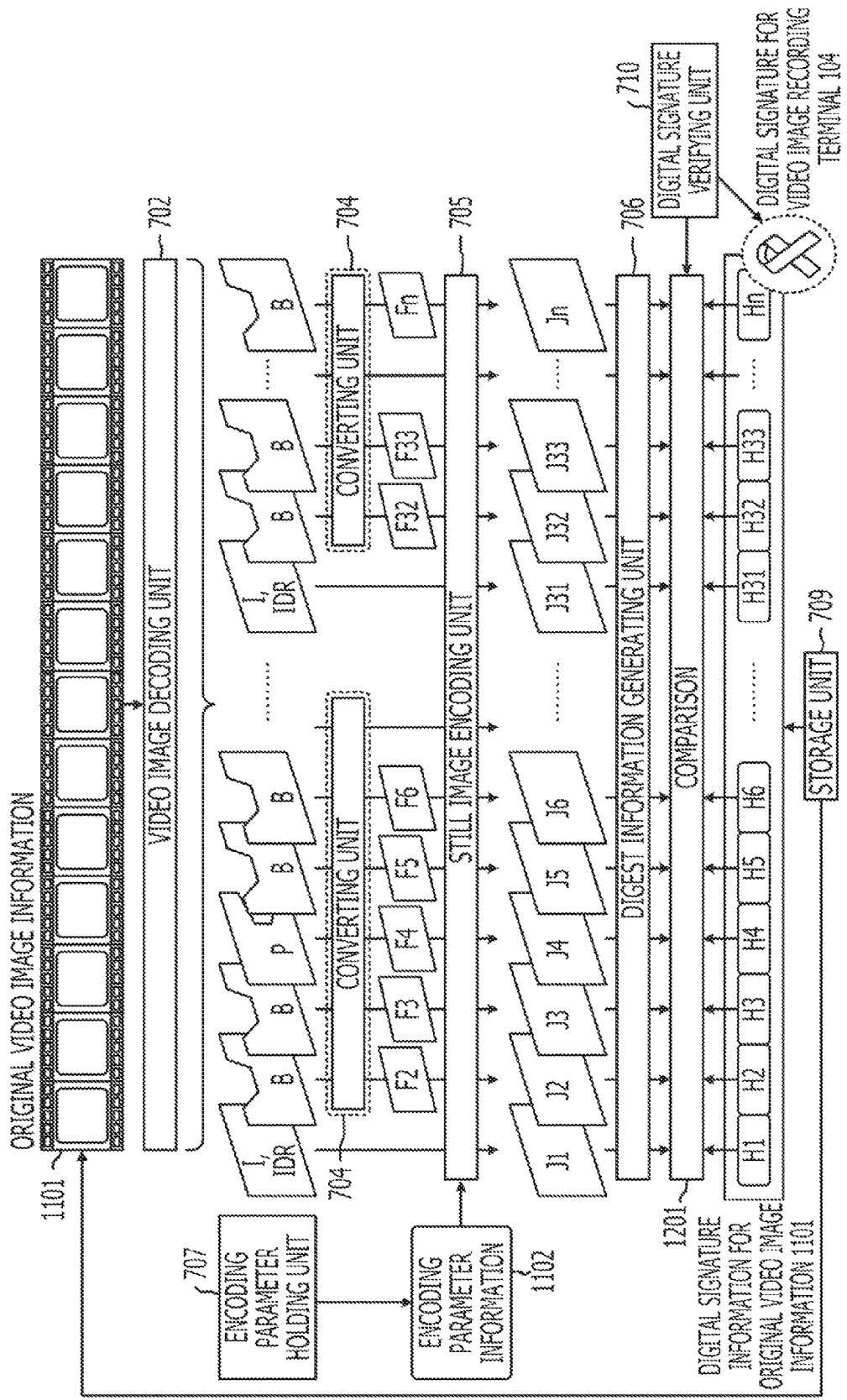
FIG. 12 is a diagram illustrating the outline of a process of verifying the digital signature for the original video image information.

FIG. 12 is a diagram illustrating the outline of the process of verifying the digital signature for the original video information. The digital signature verifying device 107 acquires the original video image information 1101 and the digital signature information for the original video image information 1101 from the storage unit 709. The digital signature verifying unit 710 uses the digital signature information for the original video image information 1101 so as to verify that the acquired video image information 1101 is not altered.

The process of generating digest information from original video image information is performed in the same manner in the process of verifying the digital signature for the original video image information and in the process for generating the digital signature for the original image information. Specifically, the video image decoding unit 702 analyzes the original video image information 1101 for each of the frames and arranges the frames in chronological order. Then, the transfer unit 703 transfers P and B pictures to the converting unit 704 and transfers I and IDR pictures to the still image encoding unit 705.

The frames that are transferred to the converting unit 704 are converted into independently replayable video image frames by the converting unit 704. In this manner, the digital signature verifying device 107 generates the video image frames (I pictures, IDR pictures) transferred from the transfer unit 703 and the video image frames obtained by the conversion performed by the converting unit 704. The independently replayable video image frames are indicated by F2, F3, . . . , Fn. In the digital signature verifying unit 107, the still image encoding unit 705 encodes the video image frames converted by the converting unit 704 and the video image frames (that are I and IDR pictures) transferred from the transfer unit 703 so as to generate still images. The generated still images are indicated by J1, J2, J3, . . . , Jn. The still image encoding unit 705 may acquires encoding parameter information 1102 from the encoding parameter holding unit 707, reference a parameter value included in the encoding parameter information 1102, and encode the frames on the basis of the parameter value.

In the digital signature verifying device 107, the digest information generating unit 706 generates a digest information for each of the encoded still images. Lastly, in the digital signature verifying device 107, the digital signature verifying unit 710 performs a comparison process 1201 on each of the digest information so as to compare the generated digest information with the digest information acquired from the storage unit 709. When all the generated digest information match the digest information acquired from the storage unit 709, the digital signature verifying device 107 can confirm that the original video image information is not altered. The process of verifying the original video image information is performed by the aforementioned operations. The process illustrated in FIG. 12 is described later in detail with reference to FIG. 25.

Figure 13:
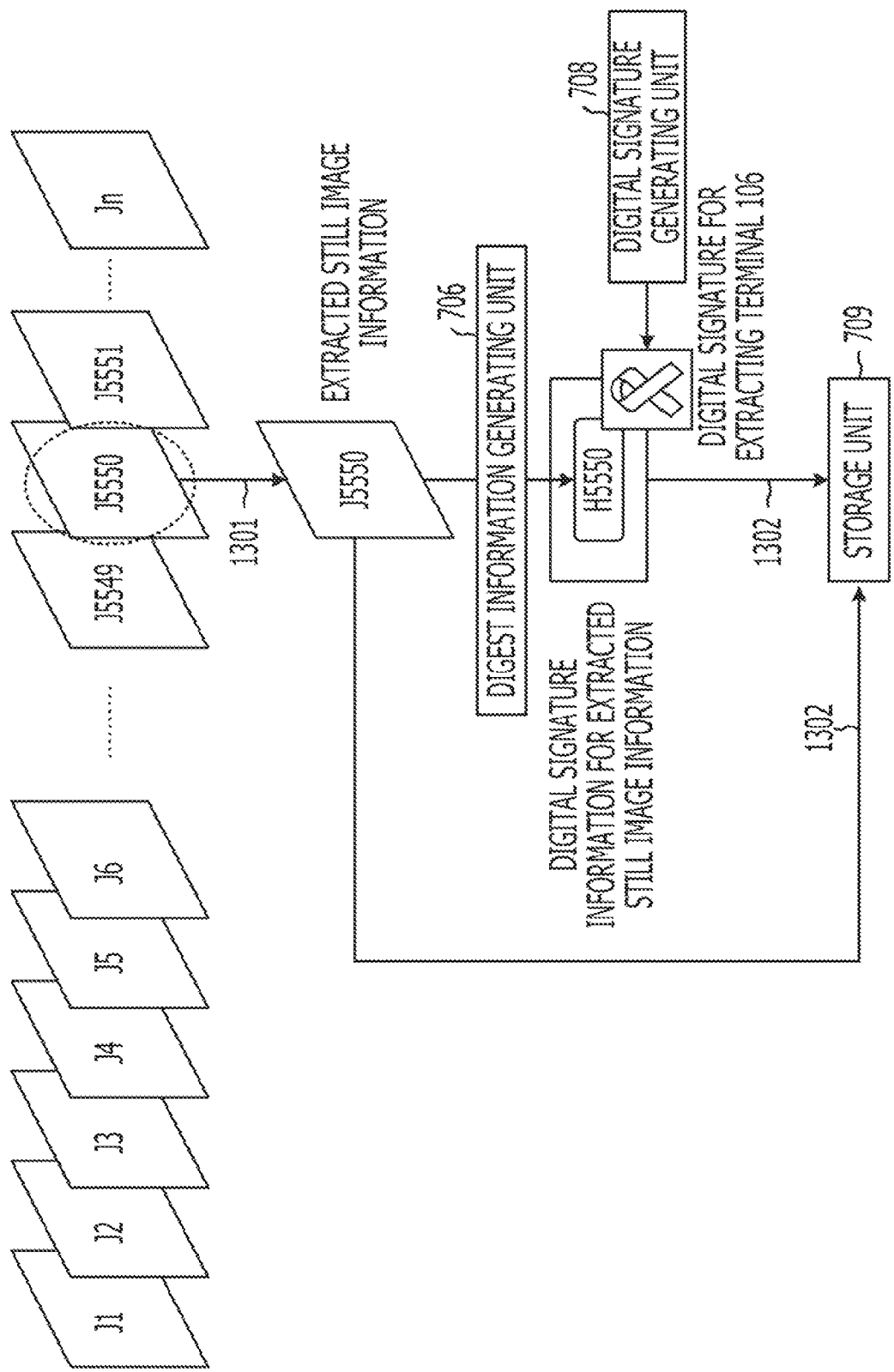
FIG. 13 is a diagram illustrating the outline of a process of generating a digital signature for extracted still image information.

FIG. 13 is a diagram illustrating the outline of the process of generating a digital signature for extracted still image video information. As illustrated in FIG. 13, in the present embodiment, a digest information is generated on the basis of a still image J5550 as an example. The video image extracting device 105 performs an operation 1301 so as to acquire the still image J5550 as extracted still image information. The video image extracting device 105 generates a digest information H5550.

In addition, the video image extracting device 105 causes the acquired still image to be stored in the storage unit 709. Then, the video image extracting device 105 treats the generated digest information H5550 as information to be digitally signed, and the digital signature generating unit 708 generates a digital signature for the extracting terminal 106 from the generated digest information H5550. The video image extracting device 105 performs an operation 1302 so that the digest information H5550 and the generated digital signature is constituted by digital signature information for the extracted still image information and the digital signature information is stored in the storage unit 709. In substantially the same manner as the process of generating the digital signature information for the original video image information, the digital signature information may include, as information to be digitally signed, the encoding parameter information 1102 used by the still image encoding unit 705. The process of generating the digital signature for the extracted still image information is performed by the aforementioned operations. The process illustrated in FIG. 13 is described later with reference to FIG. 26.

The still image that is extracted by the aforementioned operation is pasted in digital data on a report, for example. When a still image is extracted, it is possible to disclose only necessary information, and the size of a file can be reduced compared with the original video image information.

Figure 14:
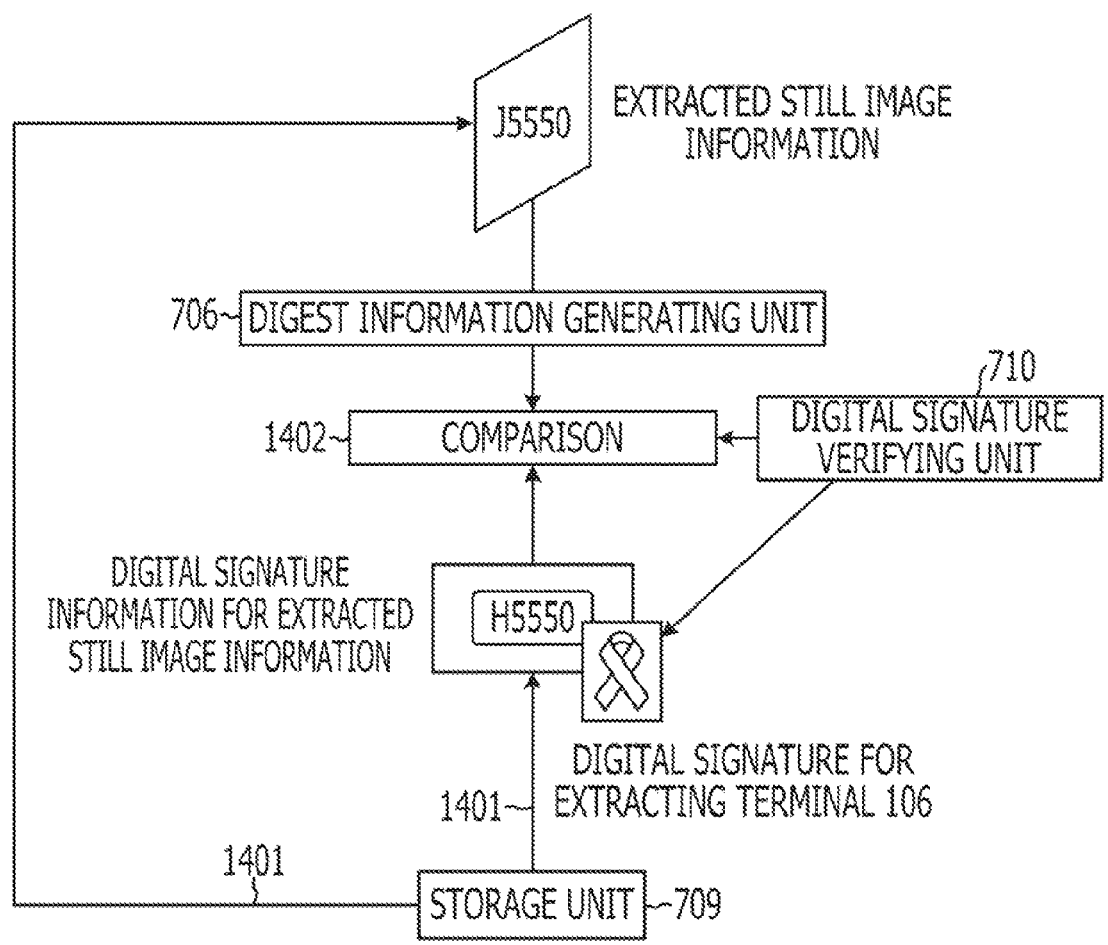
FIG. 14 is a diagram illustrating the outline of a process of verifying the digital signature for the extracted still image information.

FIG. 14 is a diagram illustrating the outline of the process of verifying the digital signature for the extracted still image information. The digital signature verifying device 107 performs an operation 1401 so as to acquire the still image J5550 (extracted still image information) and the digital signature information for the extracted still image information from the storage unit 709. The digital signature information for the extracted still image information includes the digest information H5550 and the digital signature for the extracting terminal 106. First, in the digital signature verifying device 107, the digital signature verifying unit 710 verifies the digital signature (added to the digital signature information for the extracted still image information) and confirms whether or not the digital signature information for the extracted still image information is altered.

Next, in the digital signature verifying device 107, the digest information generating unit 706 generates a digest information on the basis of the still image J5550. After the generation of the digest information, in the digital signature verifying device 107, the digital signature verifying unit 710 performs a comparison process 1402 so as to compare the generated digest information with the digest information H5550. When the generated digest information matches the digest information H5550, the digital signature verifying device 107 can confirm that the extracted still image information is not altered after the extracted still image information is generated. The process of verifying the digital signature for the extracted still image information is performed by the aforementioned operations. The process illustrated in FIG. 14 is described later with reference to FIG. 28.

Figure 15:
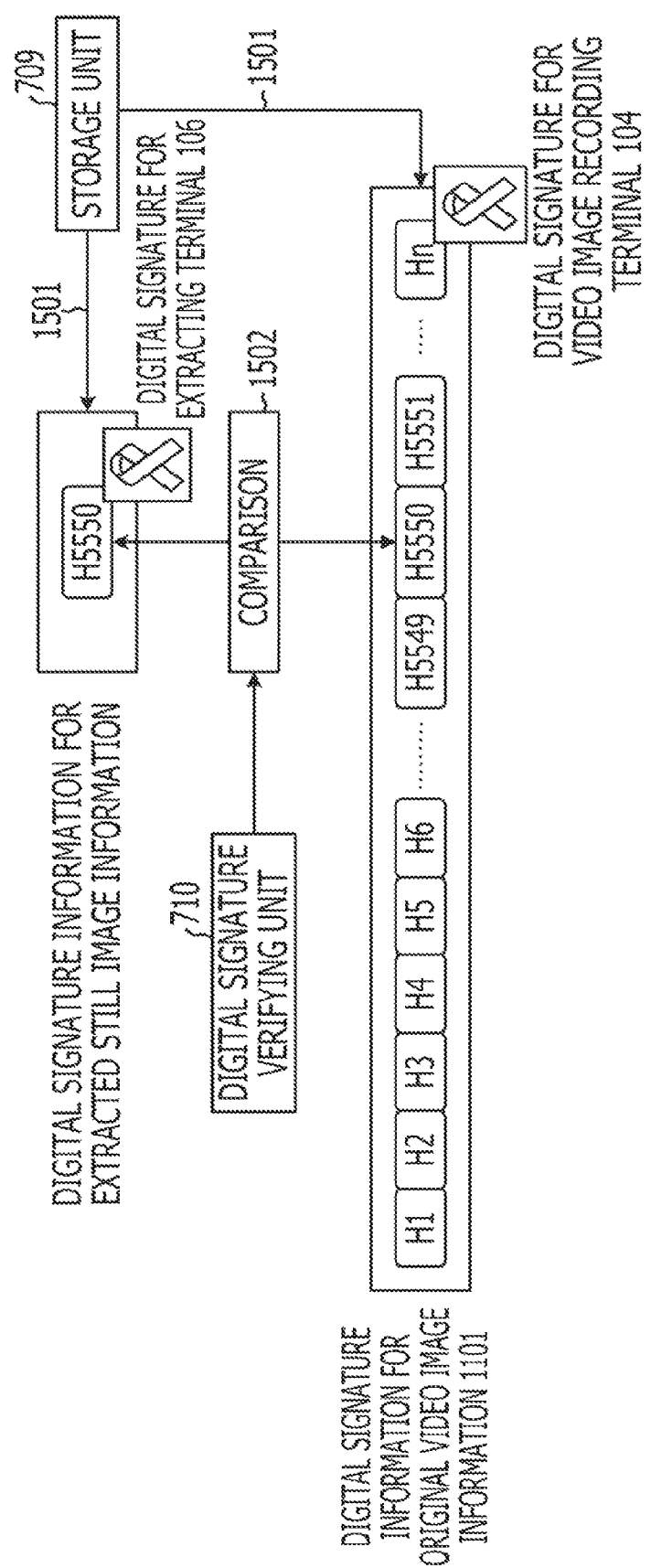
FIG. 15 is a diagram illustrating the outline of a process of verifying that the extracted still image information is a part of the original video image information.

FIG. 15 is a diagram illustrating the outline of a process of verifying that the extracted still image information is a part of the original video image information. The digital signature verifying device 107 performs an operation 1501 so as to acquire the digital signature information for the original video image information 1101 and the digital signature information for the extracted still image information from the storage unit 709. After the acquisition, the digital signature verifying device 107 performs a comparison process 1502 so as to compare the digest information H5550 included in the digital signature information for the extracted still image information with the digest information H5550 that is included in a group of digest information included in the digital signature information for the original video image information 1101. When the digest information H5550 matches each other, the digital signature verifying device 107 can ensure that the extracted still image information is a part of the original video image information.

In the example described above, since it is obvious that the extracted still image information is information on the 5550-th frame based on the first frame of the original video image information, the digest information H5550 that corresponds to the 5550-th frame (frame 5550) is acquired from the group of digest information of the original video image information. When the position of a frame corresponding to the extracted still image information in the original video image information is not obvious, the digital signature verifying device 107 performs the comparison process 1502 on the frames in order from the first frame. When a frame that matches the frame corresponding to the extracted still image information is present, the digital signature verifying device 107 may ensure that the extracted still image information is a part of the original video image information. In a flowchart (described later) illustrated in FIG. 29, it is assumed that the position of a frame corresponding to the extracted still image information in the original video image information is not obvious.

In the process of generating the digital signature for the extracted still image information, the information to be digitally signed may include the digest information and a frame number, and the digital signature for the extracted still image information may be generated. In the process of verifying the digital signature, the frame number may be acquired from the information (to be digitally signed) for the extracted still image information and the position of the frame in the original video image information may be determined. The process of verifying that the extracted still image information is a part of the original video image information is performed by the aforementioned operations. The process illustrated in FIG. 15 is described later in detail with reference to FIG. 29.

Figure 16:
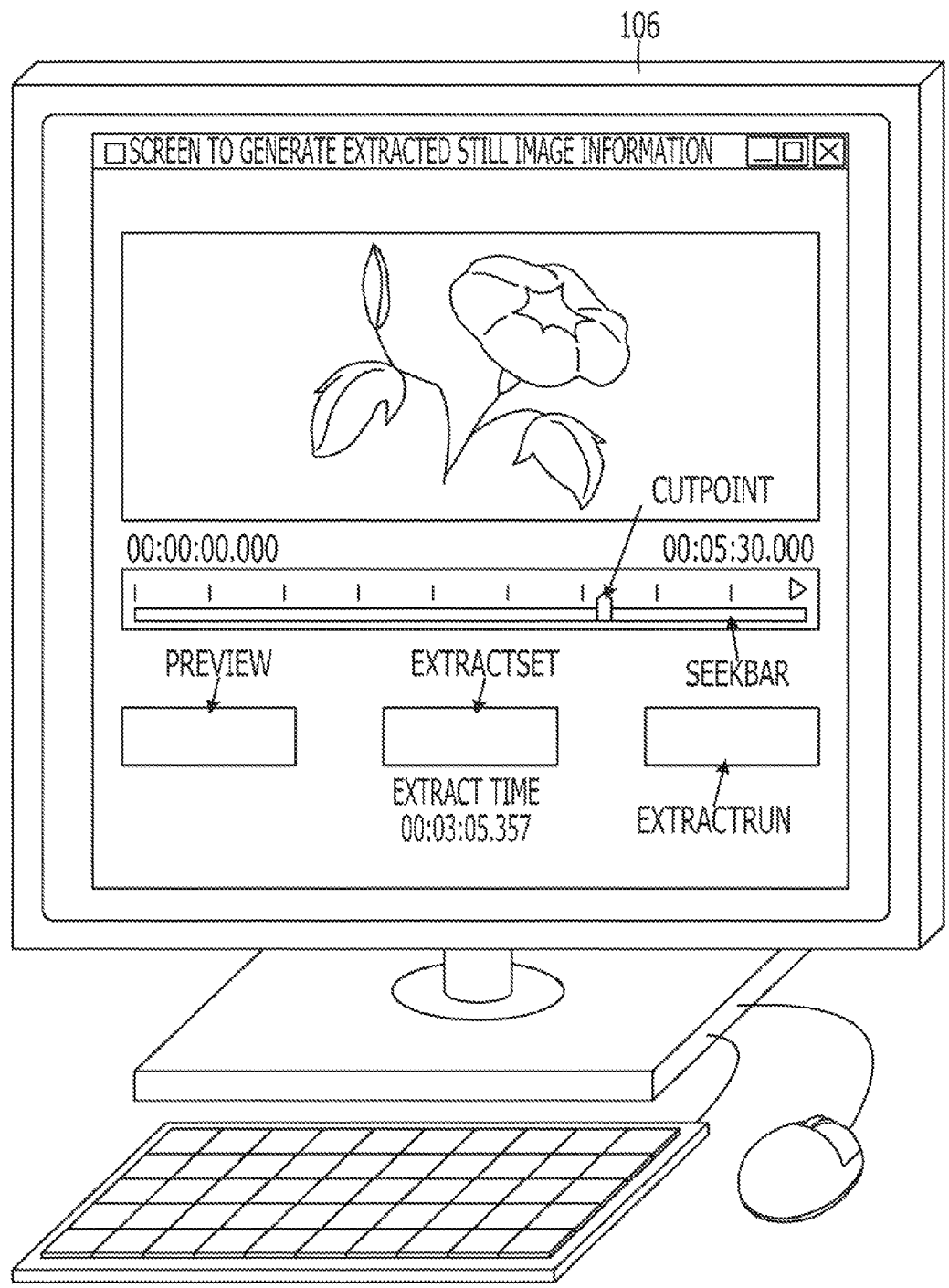
FIG. 16 is a diagram illustrating an operation of extracting original video image information.

FIG. 16 is a diagram illustrating an operation of extracting original video image information. When a user press a PREVIEW button of the extracting terminal 106, the extracting terminal 106 replays extracted still image information. Then, when the user specifies a cut point, a still image can be extracted while the user views the image. As a method for extracting a still image, when a seek bar is operated, the extracting terminal 106 changes the time of the original video image information to the cut point.

Then, when the user presses an EXTRACT SET button of the extracting terminal 106 while the time of the original video image information is set to the cut point, the extracting terminal 106 sets the cut point. This operation determines the cut point. Then, when the user presses an EXTRACT RUN button of the extracting terminal 106, the extracting terminal 106 generates extracted still image information that corresponds to the cut point.

Figure 17:
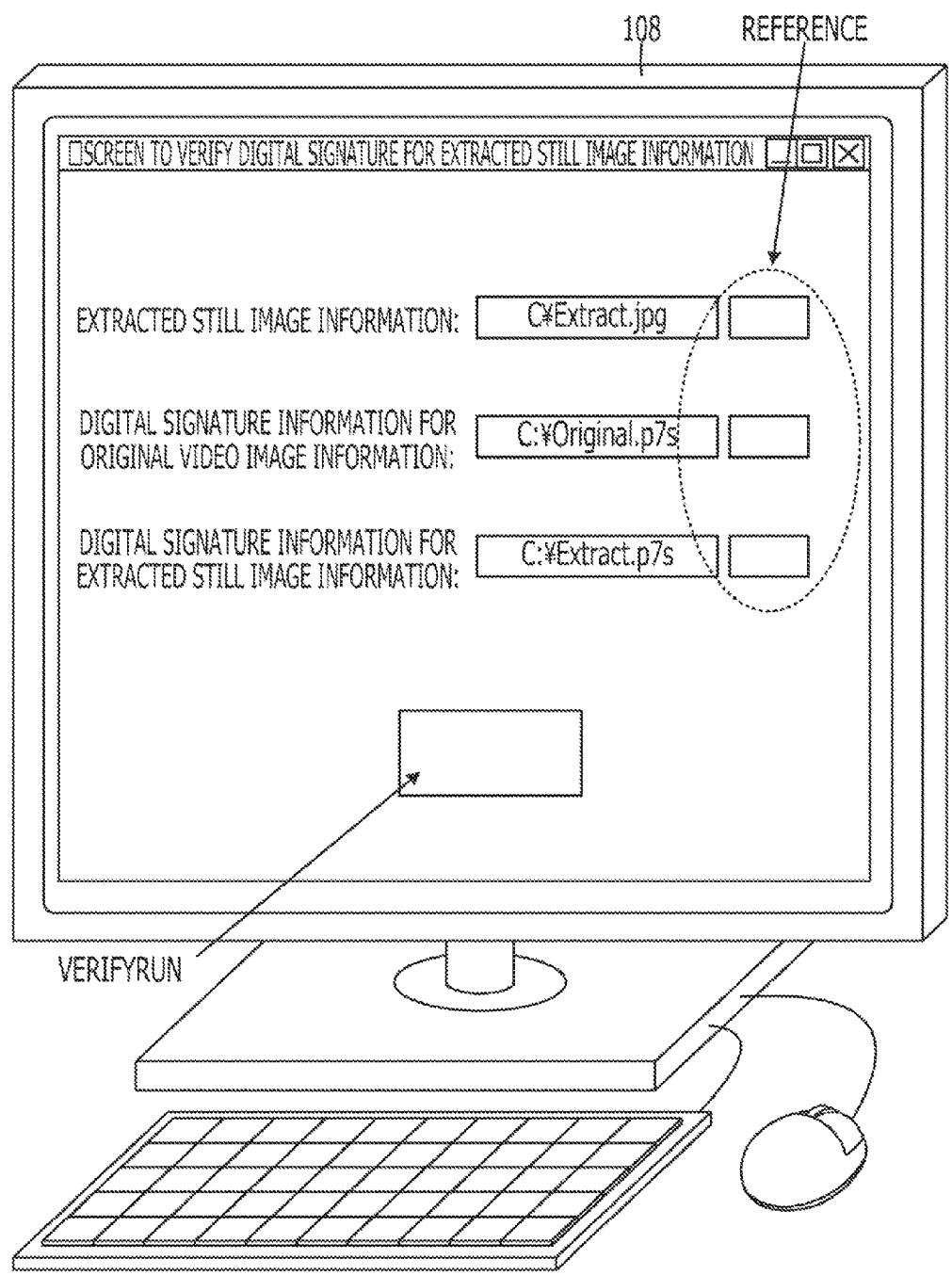
FIG. 17 is a diagram illustrating a screen for selection of still image information to be verified and digital signature information.

FIG. 17 is a diagram illustrating a screen for selection of still image information to be verified and digital signature information. The verifying terminal 108 selects extracted still image information, digital signature information for original video image information and digital signature information for the extracted still image information. When a user presses REFERENCE buttons for fields, the user can select information from the fields on Explorer and the like. Specifically, when the REFERENCE buttons are pressed, the verifying terminal 108 references and selects extracted still image information stored in the video image management database 501 included in the digital signature verifying unit 107. In the process of verifying a digital signature for extracted still image information in the present embodiment, the extracted still image information, the digital signature information for the original video image information, and the digital signature information for the extracted still image information are necessary.

When a VERIFY RUN button is pressed, the verifying terminal 108 performs a process of verifying a digital signature for selected extracted still image information. In the present embodiment, the user selects digital signature information for original video image information and digital signature information for extracted still image information in the verifying terminal 108. When the user selects only extracted still image information without consideration of the digital signature information, the verifying terminal 108 may perform the process of verifying a digital signature for the selected extracted still image information.

For example, titles that allow the user to easily predict and identify the contents of extracted still image information may be added to the verifying terminal 108, and the verifying terminal 108 may generate a list of the titles. The user may select extracted still image information from the list. In this case, the verifying terminal 108 may have link information that allows to identify that still image information selected from the list matches any of still image information stored in the video image management database 501 included in the digital signature verifying device 107.

Figure 18:
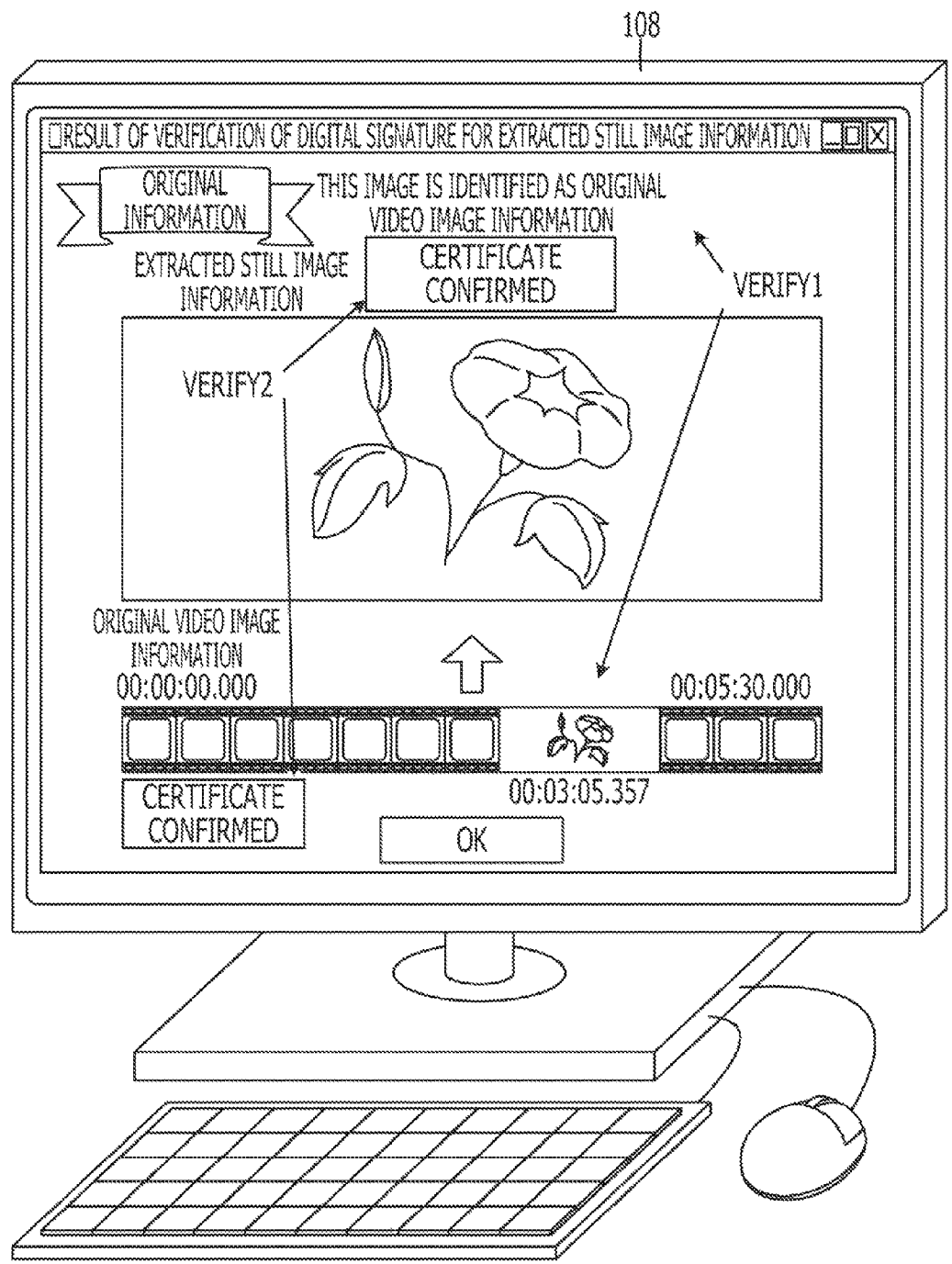
FIG. 18 is a diagram illustrating the result of verification of a digital signature for extracted still image information.

FIG. 18 is a diagram illustrating the result of the verification of the digital signature for the extracted still image information. The verifying terminal 108 references the verification result and confirms whether or not the extracted still image information is a part of the original video image information. In addition, the verifying terminal 108 displays the cut point (indicated by VERIFY 1 in FIG. 18) that indicates the position of the extracted still image information in the original video image information. Furthermore, the verifying terminal 108 displays a message (indicated by VERIFY 1 in FIG. 18) indicates whether or not the extracted still image information is altered. Thus, the user can confirm the originality of the extracted still image information.

The verifying terminal 108 can confirm each of digital signatures and thereby confirm a device that has generated original video image information (or confirm a person who has operated a device to cause the device to generate the original video image information). Then, the verifying terminal 108 can display the device (or the person) (indicated by VERIFY 2 in FIG. 18). In addition, the verifying terminal 108 can confirm a digital signature and thereby confirm a device that has extracted still image information (or confirm a person who has operated a device to cause the device to extract the still image information). Then, the verifying terminal 108 can display the device (or the person) (indicated by VERIFY 2 in FIG. 18). In the present embodiment, it can be confirmed that the original video image information is generated by the video image recording terminal 104 and the extracted still image information is generated by the extracting terminal 106.

The system uses the aforementioned devices and configurations and performs the five processes: the process of generating original video image information; the process of verifying a digital signature for the original video image information; the process of generating extracted still image information; the process of acquiring the extracted still image information; and the process of verifying a digital signature for the extracted still image information. In the process of generating original video image information, the process of generating a digital signature for the original video image information is performed. In the process of generating the digital signature for the original video image information, the process of decoding a video image included in the original video image information, the process of generating independent frames, and the process of generating the digital signature are performed. In the process of verifying the digital signature for the original video image information, the process of decoding the video image included in the original video image information, and the process of generating the independent frames are performed. The processes are described later with reference to flowcharts illustrated in FIGS. 19 to 29. Dashed arrows in the flowcharts each indicate that data is transmitted from a device and received by another device.

In the process of generating extracted still image information, after the process of verifying the digital signature for the original video image information is performed, the process of generating a digital signature for the extracted still image information and the process of generating a digital signature are performed. In the process of extracting still image information, after the process of verifying the digital signature for the original video image information is performed, the process of verifying the digital signature for the extracted still image information and the process of verifying that the extracted still image information is a part of the original video image information are performed. In the process of verifying a digital signature for extracted still image information, the process of verifying the digital signature for the extracted still image information is performed. In the process of generating a digital signature and the process of verifying the digital signature, after a process (described later with reference to FIG. 19) of registering a public key for the digital signature is performed, a process (described later with reference to FIG. 20) of transmitting and receiving information including the digital signature is performed and a verifying process is performed by a receiving device.

Figure 19:
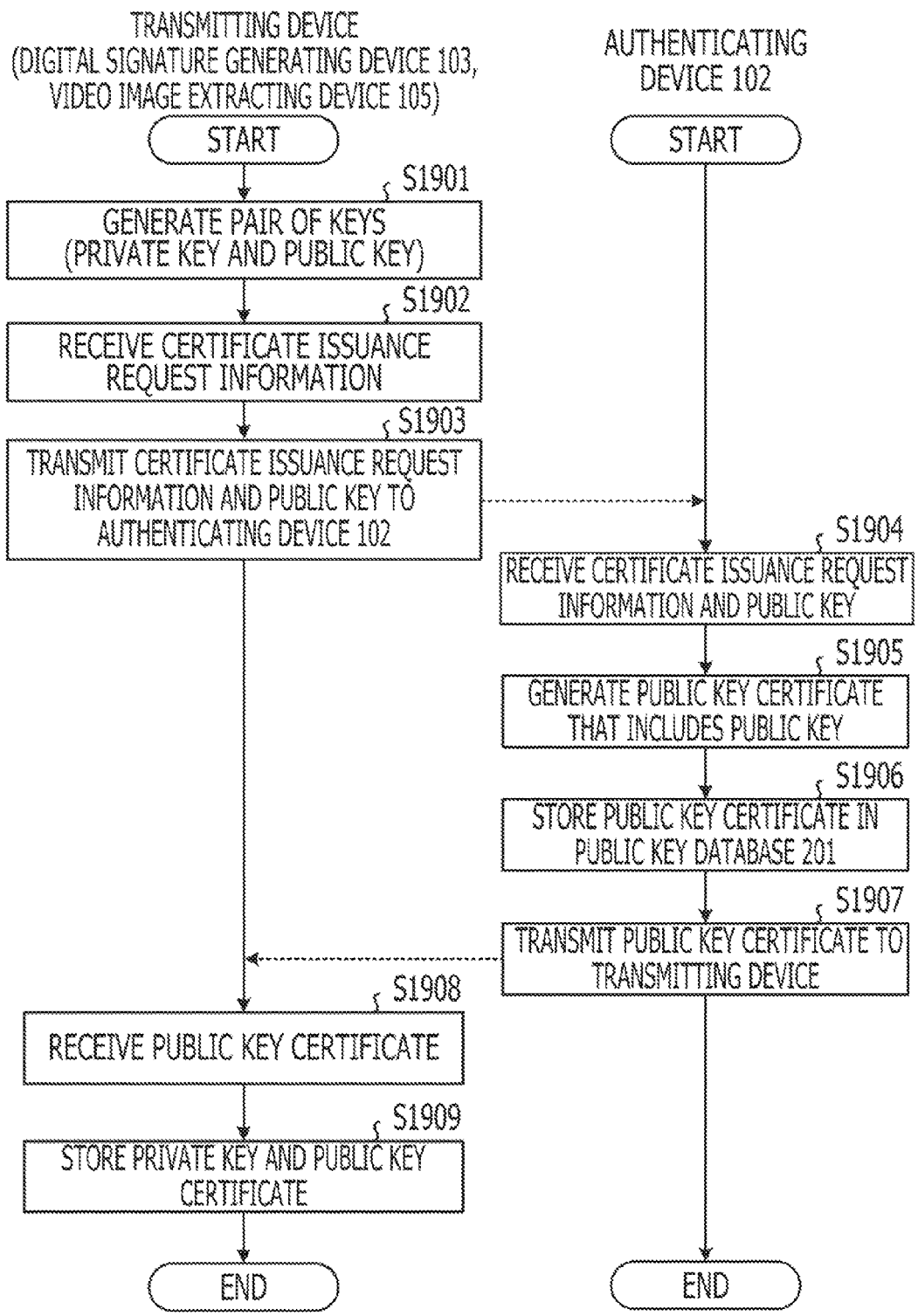
FIG. 19 is a flowchart of a process of registering a public key for a digital signature.

FIG. 19 is a flowchart of the process of registering a public key for a digital signature. FIG. 19 illustrates the process of registering a public key in a transmitting device and the authenticating device 102. In the present embodiment, the digital signature generating device 103 and the video image extracting device 105 each serve as the transmitting device that transmits a digital signature.

First, the transmitting device generates a pair of keys (private key and public key) (S1901). Subsequently, the transmitting device receives information (certificate issuance request information) on a request for issuing a certificate (S1902). The received information is information related to the video image recording terminal 104 and the extracting terminal 106. When the plurality of video image recording terminals 104 are present, the transmitting device may receive the certificate issuance request information for each of the video image recording terminals 104. In addition, when multiple users use the extracting terminal 106, the transmitting device may receive certificate issuance request information for each of the users and use different public keys for the users. After the transmitting device receives the certificate issuance request information, the transmitting device transmits the received certificate issuance request information and the public key to the authenticating device 102 (S1903).

The communicating unit 204 that is included in the authenticating device 102 receives the certificate issuance request information and the public key (S1904). The certificate issuing unit 202 that is included in the authenticating device 102 generates a public key certificate that includes the public key (S1905) and stores the generated public key certificate in the public key database 201 (S1906). After that, the certificate issuing unit 202 controls the communicating unit 204 so that the communicating unit 204 transmits the issued public key certificate through the network 101 to the transmitting device that has transmitted the certificate issuance request information (S1907).

The transmitting device receives the public key certificate (S1908) and stores, in a storage region included in the transmitting device, the private key generated in S1901 and the public key certificate issued by the authenticating device 102 (S1909). Then, the transmitting device terminates the process. The storage region that is included in the digital signature generating device 103 is a storage region included in the digital signature generating unit 303, while the storage region that is included in the video image extracting device 105 is a storage region included in the digital signature generating unit 403.

Figure 20:
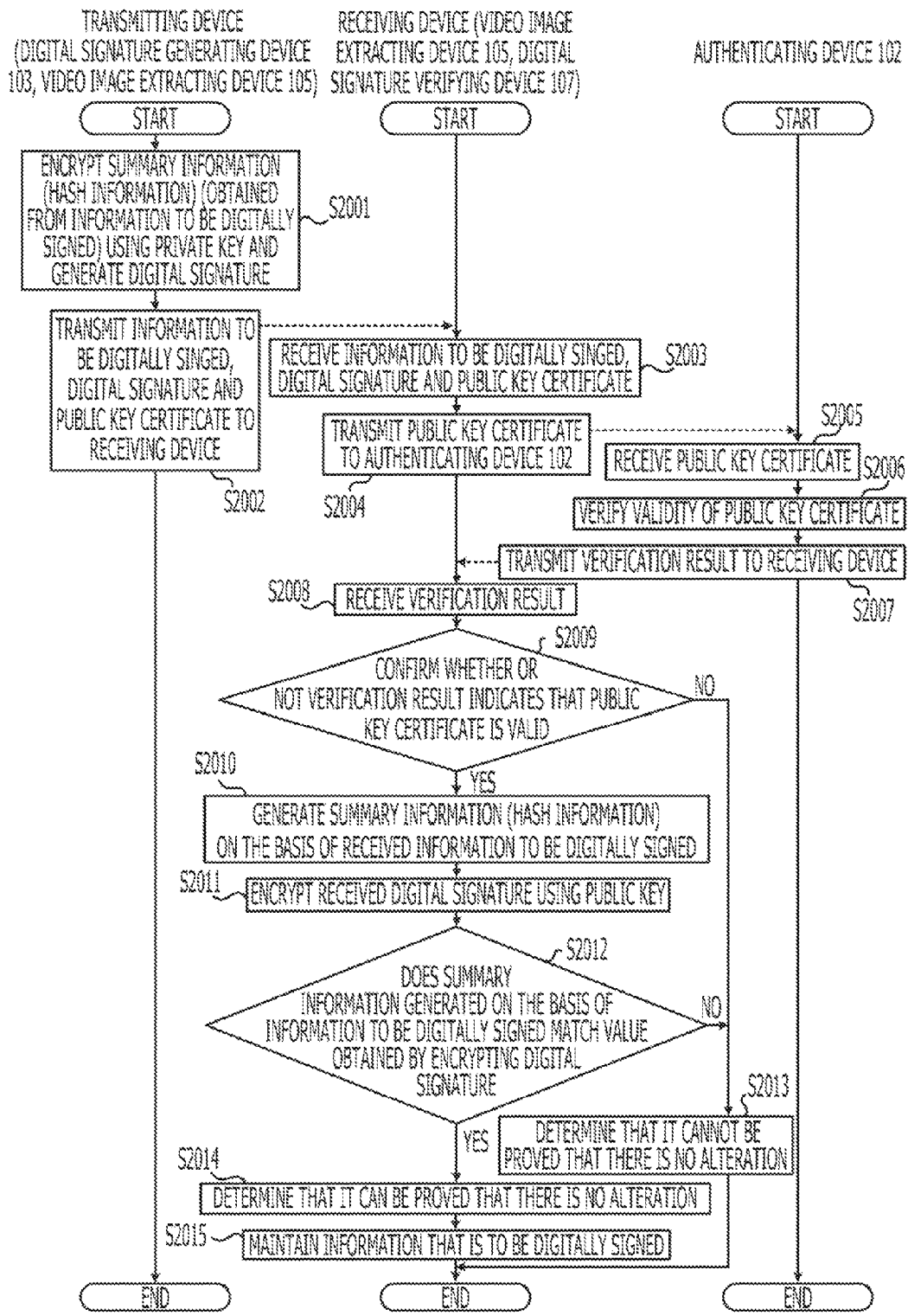
FIG. 20 is a flowchart of a process of transmitting and receiving information including a digital signature and a verifying process that is performed by a receiving device.

FIG. 20 is a flowchart of the process of transmitting and receiving information including a digital signature and a verifying process that is performed by a receiving device. FIG. 20 illustrates the process in which information that includes a digital signature is transmitted from the transmitting device and received by the receiving device. In addition, FIG. 20 illustrates the process in which the digital signature is verified by the receiving device and the authenticating device 102. In the present embodiment, the digital signature generating device 103 and the video image extracting device 105 each serve as the transmitting device. In addition, in the present embodiment, the receiving device that receives the information from the digital signature generating device 103 is the video image extracting device 105, while the receiving device that receives the information from the video image extracting device 105 is the digital signature verifying device 107.

The transmitting device encrypts summary information (hash information) (obtained from information to be digitally signed) using the private key stored in the storage region (S2001). The encrypted information is a digital signature. Subsequently, the transmitting device transmits the information to be digitally signed, the digital signature and the public key certificate (stored in the storage region) to the receiving device (S2002).

The receiving device receives the information to be digitally signed, the digital signature and the public key certificate (S2003). Then, the receiving device transmits the public key certificate to the authenticating device 102 in order to confirm the validity date, revocation information and the like of the received public key certificate (S2004). In the present embodiment, the authenticating device 102 supports a series of functions of issuing and verifying certificates. Next, the authenticating device 102 receives the public key certificate (S2005), verifies the validity of the public key certificate (S2006) and transmits the verification result to the receiving device (S2007).

The receiving device receives the verification result (S2008) and confirms whether or not the verification result indicates that the public key certificate is valid (S2009). When the verification result indicates that the public key certificate is not valid (No in S2009), the receiving device determines that it cannot be proved that there is no alteration (S2013). Then, the receiving device terminates the process. When the verification result indicates that the public key certificate is valid (Yes in S2009), the receiving device generates summary information (hash information) on the basis of the received information that is to be digitally signed (S2010). Then, the receiving device decrypts the received digital signature using the public key (S2011). Then, the receiving device confirms whether or not the summary information generated on the basis of the information to be digitally signed matches a value obtained by encrypting the digital signature using the public key (S2012).

When the summary information generated on the basis of the information to be digitally signed does not match the value obtained by encrypting the digital signature using the public key (No in S2012), the receiving device causes the process to proceed to S2013 and terminates the process. When the summary information generated on the basis of the information to be digitally signed matches the value obtained by encrypting the digital signature using the public key (Yes in S2012), the receiving device determines that it can be proved that there is no alteration (S2014). Then, the receiving device maintains the information to be digitally signed (S2015). Then, the receiving device terminates the process. When the process proceeds to S2013, the receiving device may perform an informing process so as to cause the terminal (operating the receiving device) to display the fact that it cannot be proved that there is no alteration. In this case, the terminal that operates the receiving device is the extracting terminal 106 when the transmitting device is the video image extracting device 105, while the terminal that operates the receiving device is the verifying terminal 108 when the transmitting device is the digital signature verifying device 107.

Figure 21:
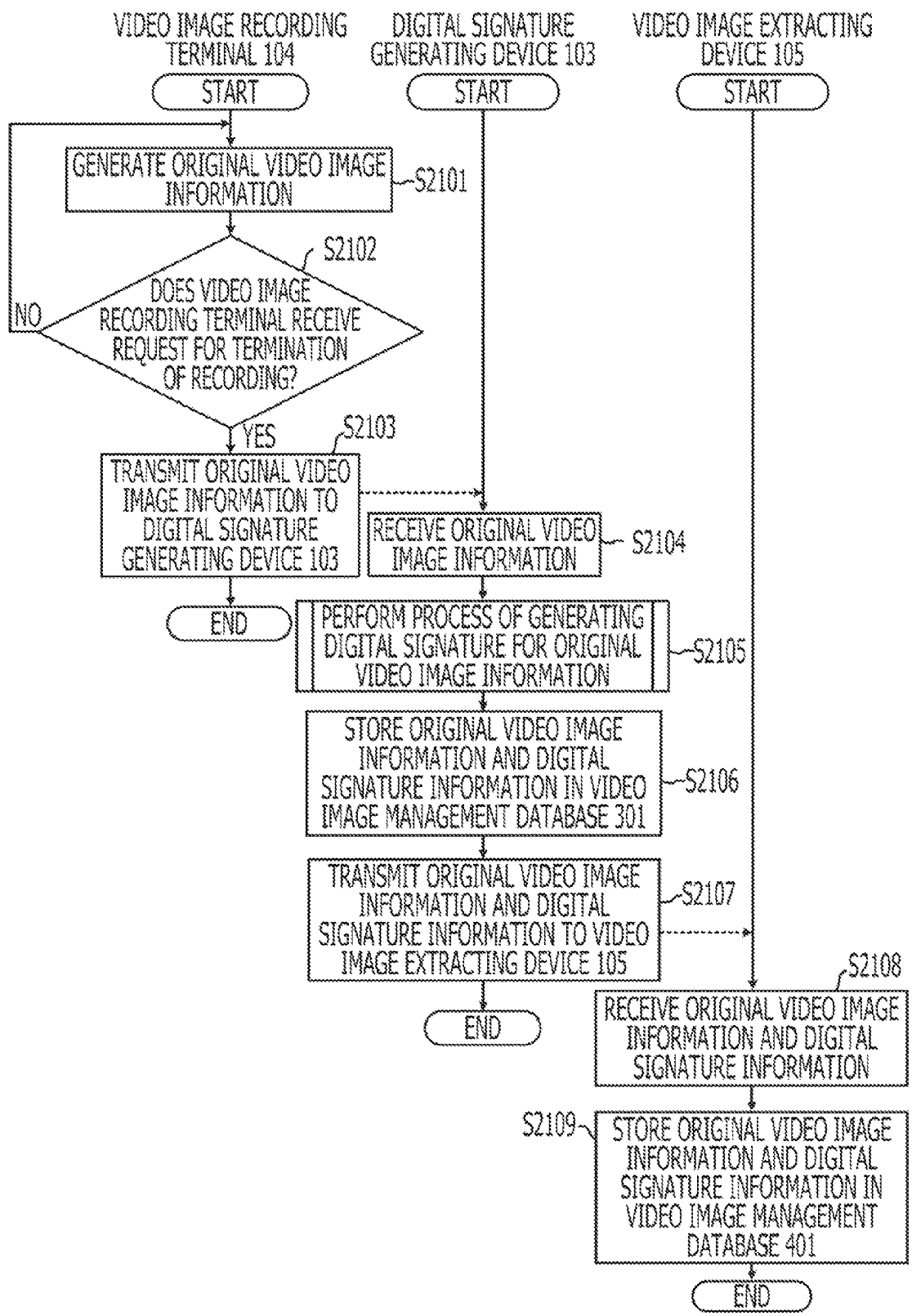
FIG. 21 is a flowchart of a process of generating original video image information.

FIG. 21 is a flowchart of the process of generating original video image information. The video image recording terminal 104 generates original video image information (S2101). After the generation of the original video image information, the video image recording terminal 104 confirms whether or not the video image recording terminal 104 receives a request (recording termination request) for termination of recording a video image (S2102). When the video image recording terminal 104 does not receive the recording termination request (No in S2102), the video image recording terminal 104 causes the process to proceed to S2101 and continuously generates the original video image information. When the video image recording terminal 104 receives the recording termination request (Yes in S2102), the video image terminal 104 transmits the generated original video image information to the digital signature generating device 103 (S2103) and terminates the process.

The digital signature device 103 receives the original video image information (S2104). The digital signature device 103 performs the process of generating a digital signature for the original video image information (S2105). The process of generating the digital signature for the original video image information is described in detail with reference to FIG. 22. After the generation of the digital signature, the digital signature device 103 stores the original video image information and the digital signature information in the video image management database 301 through the video image management table 302 (S2106). After the storage of the original video image information and the digital signature information, the digital signature generating device 103 transmits the original video image information and the digital signature information to the video image extracting device 105 (S2107) and terminates the process.

The video image extracting device 105 receives the original video image information and the digital signature information (S2108). The video image extracting device 105 stores the received original video image information and the received digital signature information in the video image management database 501 (S2109) through the video image management table 502 and terminates the process. In the present embodiment, after the video image recording terminal 104 receives the recording termination request, the video image recording terminal 104 collectively transmits the original video image information. However, the video image recording terminal 104 may sequentially transmit frames encoded in MPEG format to the digital signature generating device 105 on a GOP basis.

Figure 22:
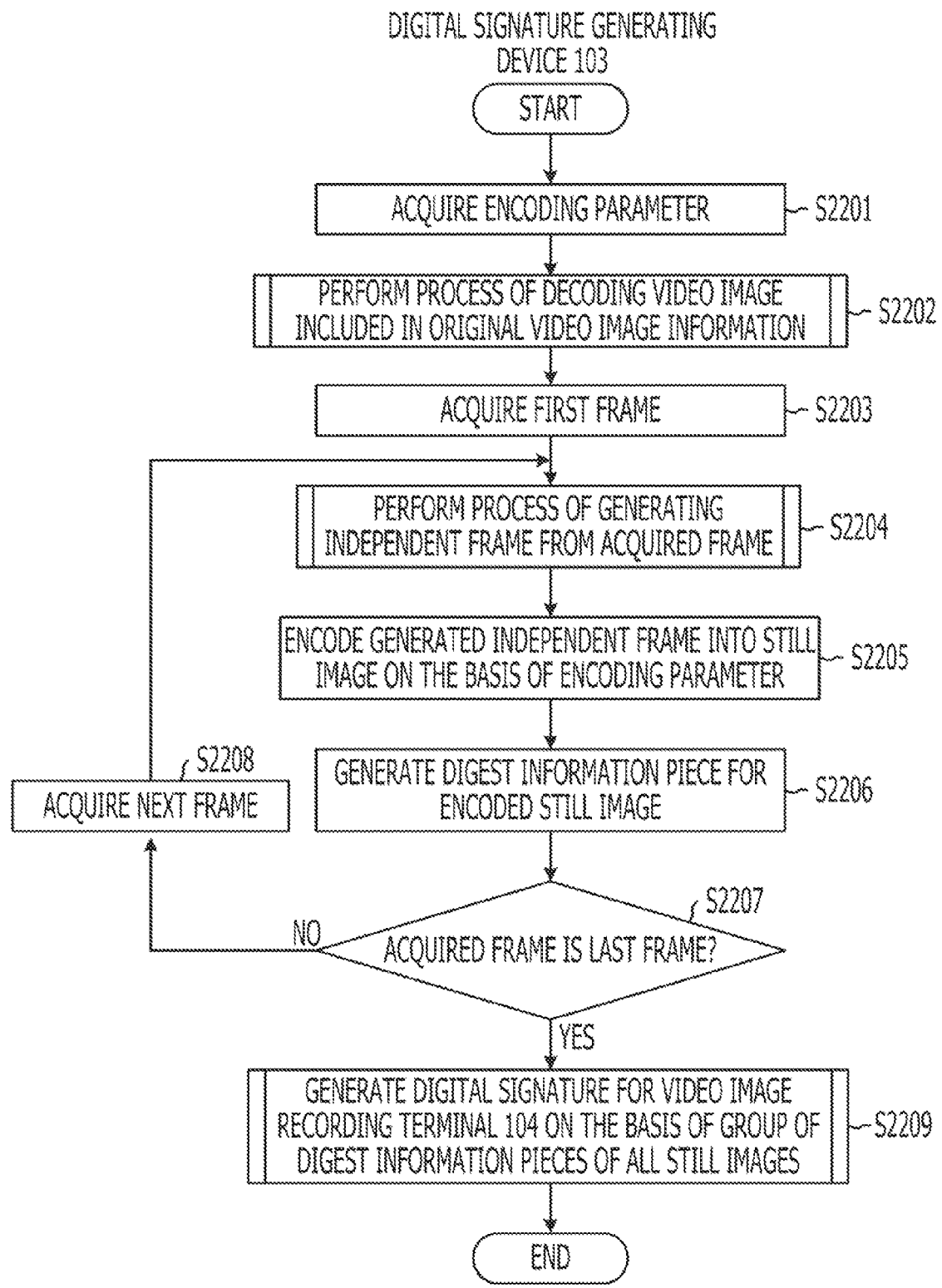
FIG. 22 is a flowchart of a process of generating a digital signature for the original video image information.

FIG. 22 is a flowchart of the process of generating the digital signature for the original video image information. In the process of generating the digital signature for the original video image information, the original video image information is acquired from the terminal that has generated the original video image information. The digital signature generating device 103 acquires an encoding parameter (S2201). After the acquisition of the encoding parameter, the digital signature generating device 103 performs the process of decoding a video image that is included in the original video information (S2202). The process of decoding the video image is illustrated by reference numerals 1001 and 1002 in FIG. 10. Specifically, the digital signature generating device 103 performs the decoding process in accordance with the format of the original video image information and determines whether each of frames included in the original video image information is an I, P or B picture. In addition, when the frames are not arranged in chronological order, the digital signature generating device 103 changes the arrangement of the frames so that the frames are arranged in chronological order and can be acquired in chronological order.

When the digital signature generating device 103 completes preparation for acquiring the frames from the original video image information on a frame basis, the digital signature generating device 103 acquires the first frame (S2203) and performs the process of generating an independent frame from the acquired frame (S2204). The process of generating the independent frame is described with reference to FIG. 23.

The digital signature generating device 103 encodes the generated independent frame into a still image on the basis of the encoding parameter (S2205). When the image format is JPEG, the digital signature generating device 103 performs JPEG encoding on each of the I, P and B pictures so as to generate still image information. Subsequently, the digital signature generating device 103 generates a digest information for the encoded still image (S2206). After the generation of the digest information, the digital signature generating device 103 confirms whether or not the acquired frame is the last frame (S2207). When the next frame is present (No in S2207), the digital signature generating device 103 acquires the next frame (in S2208) and causes the process to proceed to S2204.

When the acquired frame is the last frame (Yes in S2207), the digital signature generating device 103 generates a digital signature for the video image recording terminal 104 on the basis of a group of digest information of all still images (S2209) and terminates the process.

FIG. 23 is a flowchart of the process of generating an independent frame. The digital signature generating device 103 and the video image extracting device 105 each perform the process of generating an independent frame. The digital signature generating device 103 confirms whether or not the acquired frame is an I picture (S2301). In this case, the I picture includes an IDR picture.

When the acquired frame is an I picture (Yes in S2301), the digital signature generating device 103 converts the acquired frame into an independent frame (S2307). When the acquired frame is a P or B picture (No in S2308), the digital signature generating device 103 acquires a frame that is an I or P picture that precedes the acquired frame (S2302). In this case, the I or P picture is a picture that precedes the acquired frame in terms of time.

Next, the digital signature generating device 103 confirms whether or not the acquired frame is a P picture (S2303). When the acquired frame is a P picture (Yes in S2303), the digital signature generating device 103 converts the acquired frame (P picture) into an independent frame on the basis of the frame that precedes the acquired frame (S2306). When the acquired frame is a B picture (No in S2303), the digital signature generating device 103 acquires a frame that is an I or P picture that succeeds the B picture (S2304). After the acquisition, the digital signature generating device 103 converts the acquired frame (B picture) into an independent frame on the basis of the frame preceding the acquired frame and the frame succeeding the acquired frame (S2305).

After performing S2307, S2306 or S2305, the digital signature generating device 103 outputs the independent frame (S2308) and terminates the process. An example of the conversion performed in S2307, S2306 and S2305 is the process of changing the video image information 1003 illustrated in FIG. 10 to the video image information 1004 illustrated in FIG. 10.

Figure 24A:
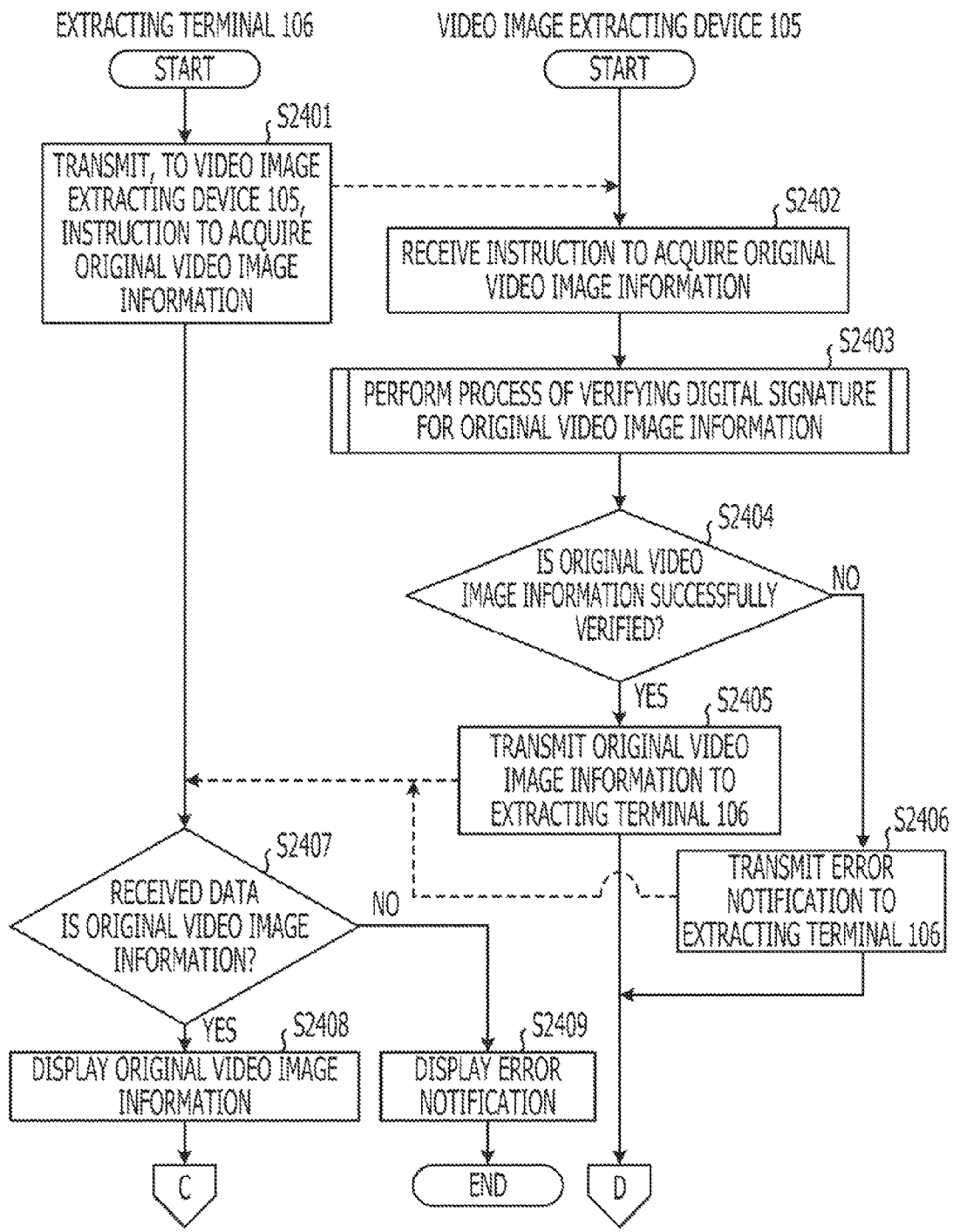

FIGS. 24A and 24B are a flowchart of the process of generating extracted still image information. In order to generate extracted still image information, original video image information is necessary. FIG. 24A illustrates a process of acquiring original video image information, while FIG. 24B illustrates a process of generating extracting still image information.

In FIG. 24A, the extracting terminal 106 transmits, to the video image extracting device 105, an instruction to acquire original video image information to be extracted (S2401). After the transmission of the instruction, the extracting terminal 106 stands by until the extracting terminal 106 receives a response from the video image extracting device 105.

The video image extracting device 105 receives the instruction to acquire the original video image to be extracted (S2402). After receiving the instruction, the video image extracting device 105 acquires the original video image information to be extracted and digital signature information for the original video image information from the video image management database 401 through the video image management table 402 included in the video image extracting device 105 and causes the digital signature verifying unit 404 to perform the process of verifying the digital signature for the original video image information (S2403). The process of verifying the digital signature for the original video image information is described in detail with reference to FIG. 25. The process of verifying the digital signature for the original video image information is performed in order to confirm whether or not the original video image information is altered before the extracting process.

After the process of verifying the digital signature for the original video image information, the video image extracting device 105 confirms whether or not the original video image information is successfully verified (S2404). When the original video image information is successfully verified (Yes in S2404), the video image extracting device 105 transmits the original video image information to the extracting terminal 106 (S2405). When the original video image information is not successfully verified (No in S2404), the video image extracting device 105 transmits an error notification to the extracting terminal 106 (S2406).

The extracting terminal 106 receives data from the video image extracting device 105 and confirms the received data (S2407). When the received data is the original video image information (Yes in S2407), the extracting terminal 106 displays the original video image information (S2408). When the received data is not the original video image information (No in S2407), the data received by the extracting terminal 106 is the error notification, and the extracting terminal 106 displays the error notification (S2409) and terminates the process.

Referring to FIG. 24B, the extracting terminal 106 generates extracted still image information (S2410). The process of generating the extracted still image information is illustrated in FIG. 13. The operation of generating the extracted still image information, which is performed by the extracting terminal 106, is illustrated in FIG. 16. In the present embodiment, it is assumed that the frame 5550 is extracted. After the generation of the extracted still image information is completed, the extracting terminal 106 transmits the generated extracted still image information to the video image extracting device 105 (S2411).

The video image extracting device 105 receives the extracted still image information (S2412) and performs a process of generating a digital signature for the extracted still image information (S2413). The process of generating the digital signature for the extracted still image information is described later with reference to FIG. 26. After the generation of the digital signature for the extracted still image information, the video image extracting device 105 stores a pair of the extracted still image information and information (digital signature information) on the digital signature for the extracted still image information in the video image management database 401 through the video image management table 402 (S2414). Subsequently, the video image extracting device 105 transmits, to the digital signature verifying device 107, the extracted still image information, the digital signature information for the extracted still image information, and information (digital signature information) on the digital signature for the original video image information (S2415).

The digital signature verifying device 107 receives the extracted still image information, the digital signature information for the extracted still image information, and the digital signature information for the original video image information (S2416). After the reception, the digital signature verifying device 107 stores the extracted still image information, the digital signature information for the extracted still image information, and the digital signature information for the original video image information in the video image management database 501 through the video image management table 502 (S2417).

Figure 25:
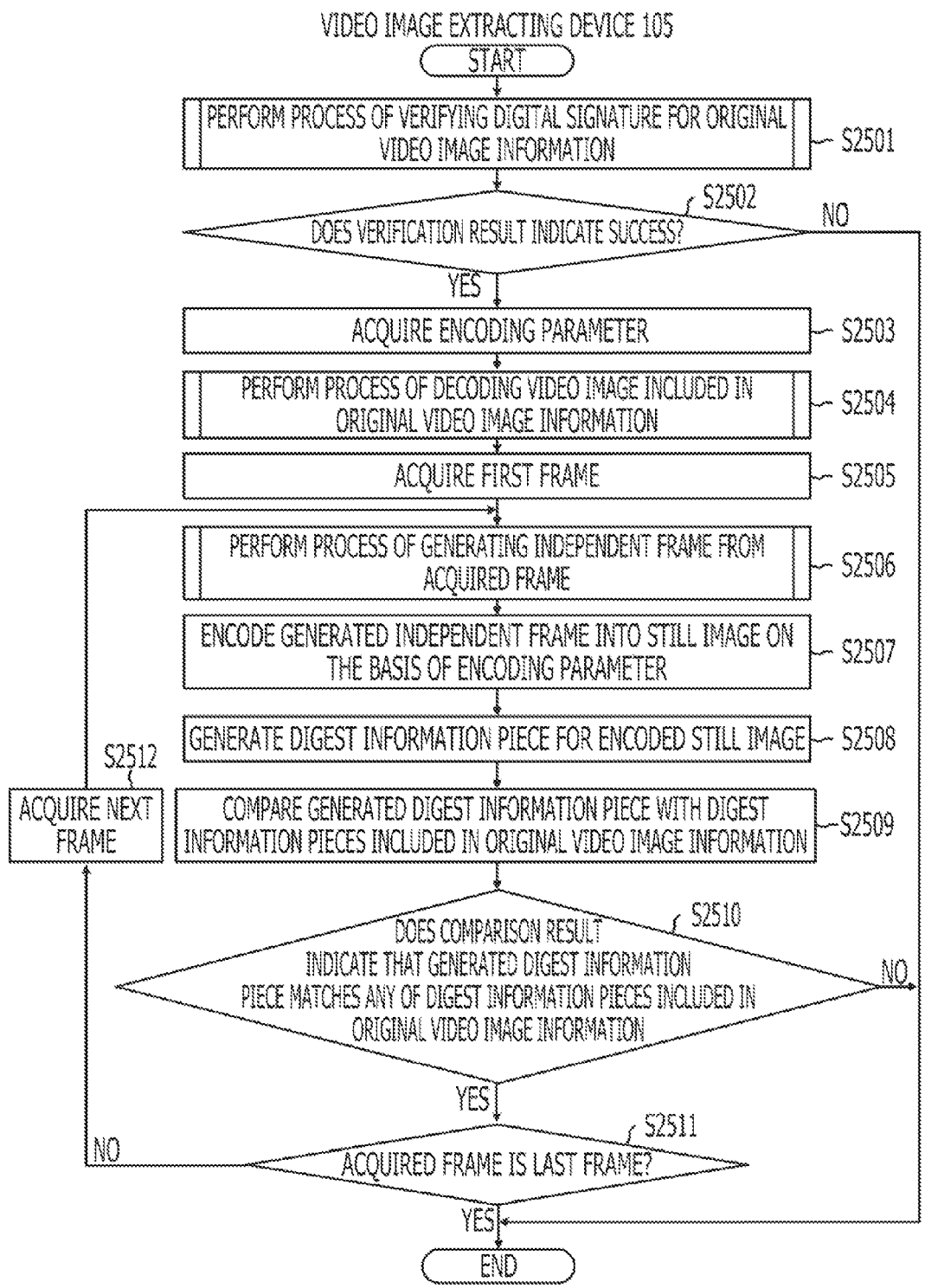
FIG. 25 is a flowchart of a process of verifying the digital signature for the original video image information.

FIG. 25 is a flowchart of the process of verifying the digital signature for the original video image information. FIG. 12 illustrates the process of verifying the digital signature for the original video image information. The video image extracting device 105 performs the process of verifying the digital signature for the original video image information (S2501). After the verification, the video image extracting device 105 confirms whether or not the verification result indicates success (S2502). When the verification result indicates failure (No in S2502), the video image extracting device 105 terminates the process and notifies the extracting terminal 106 of the fact that the original vide image information is altered.

When the verification result indicates success (Yes in S2502), the video image extracting device 105 acquires the encoding parameter (S2503). In order for the video image extracting device 105 to acquire the encoding parameter, it is necessary that the same information as the encoding parameter stored in the digital signature generating device 103 be stored in the video image extracting device 105.

Subsequently, the video image extracting device 105 performs the process of decoding a video image that is included in the original video image information (S2504). The process of decoding the video image that is included in the original video image information is substantially the same as the process (of decoding the video image that is included in the original video image information) indicated by S2202 illustrated in FIG. 22. When the video image extracting device 105 completes preparation for acquiring frames from the original video image information by performing S2504, the video image extracting device 105 acquires the first frame (S2505) and performs a process of generating an independent frame from the acquired frame (S2506). The process of generating the independent frame is described above with reference to FIG. 23.

Next, the video image extracting device 105 encodes the generated independent frame into a still image on the basis of the encoding parameter (S2507). Specifically, when the image format is JPEG, the video image extracting device 105 performs JPEG encoding on each of the I, P and B pictures so as to generate still image information. Subsequently, the video image extracting device 105 generates a digest information for the encoded still image (S2508).

After the generation of the digest information, the video image extracting device 105 compares the generated digest information with the digest information included in the digital signature information for the original video image information (S2509) and confirms whether or not the generated digest information matches any of the digest information included in the digital signature information for the original video image information (S2510). When the generated digest information does not match any of the digest information included in the digital signature information for the original video image information (No in S2510), the video image extracting device 105 terminates the process and informs the extracting device 106 of the fact that the original video image information is altered.

When the generated digest information matches any of the digest information included in the digital signature information for the original video image information (Yes in S2510), the video image extracting device 105 confirms whether or not the acquired frame is the last frame (S2511). When the acquired frame is not the last frame (No in S2511), the video image extracting device 105 acquires the next frame (S2512) and causes the process to proceed to S2506. When the acquired frame is the last frame (Yes in S2511), the video image extracting device 105 determines that the original video image information has been successfully verified. Then, the video image extracting device 105 terminates the process.

Figure 26:
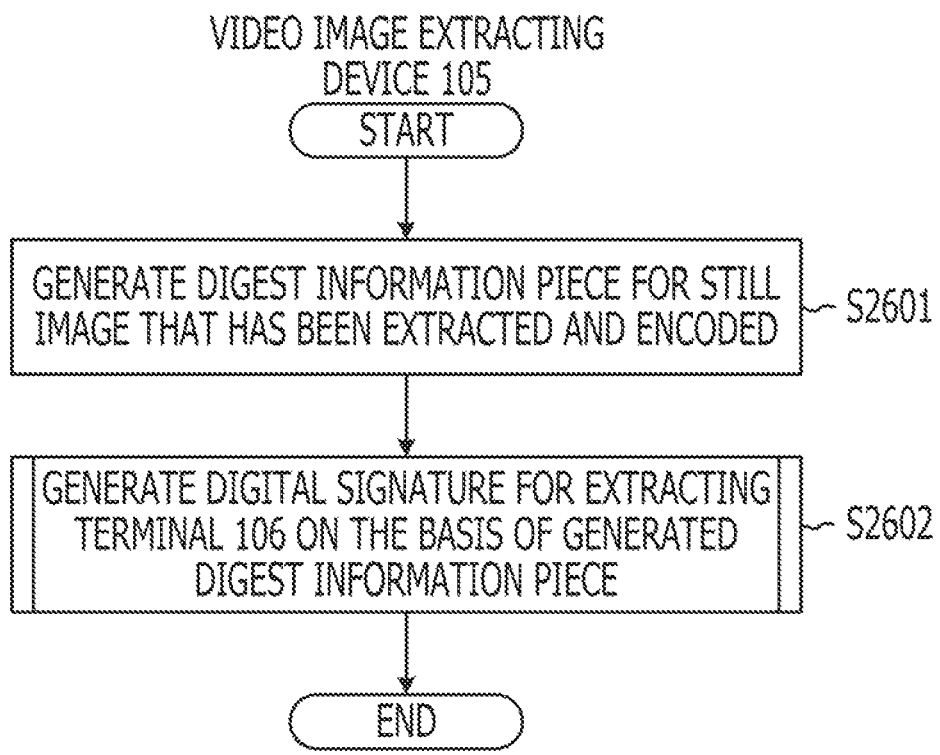
FIG. 26 is a flowchart of the process of generating the digital signature for the extracted still image information.

FIG. 26 is a flowchart of the process of generating the digital signature for the extracted still image information. The outline of the process of generating the digital signature for the extracted still image information is described above with reference to FIG. 13. The video image extracting device 105 generates a digest information for the still image that has been extracted and encoded (S2601). Subsequently, the video image extracting device 105 generates a digital signature for the extracting terminal 106 on the basis of the generated digest information (S2602).

Figure 27:
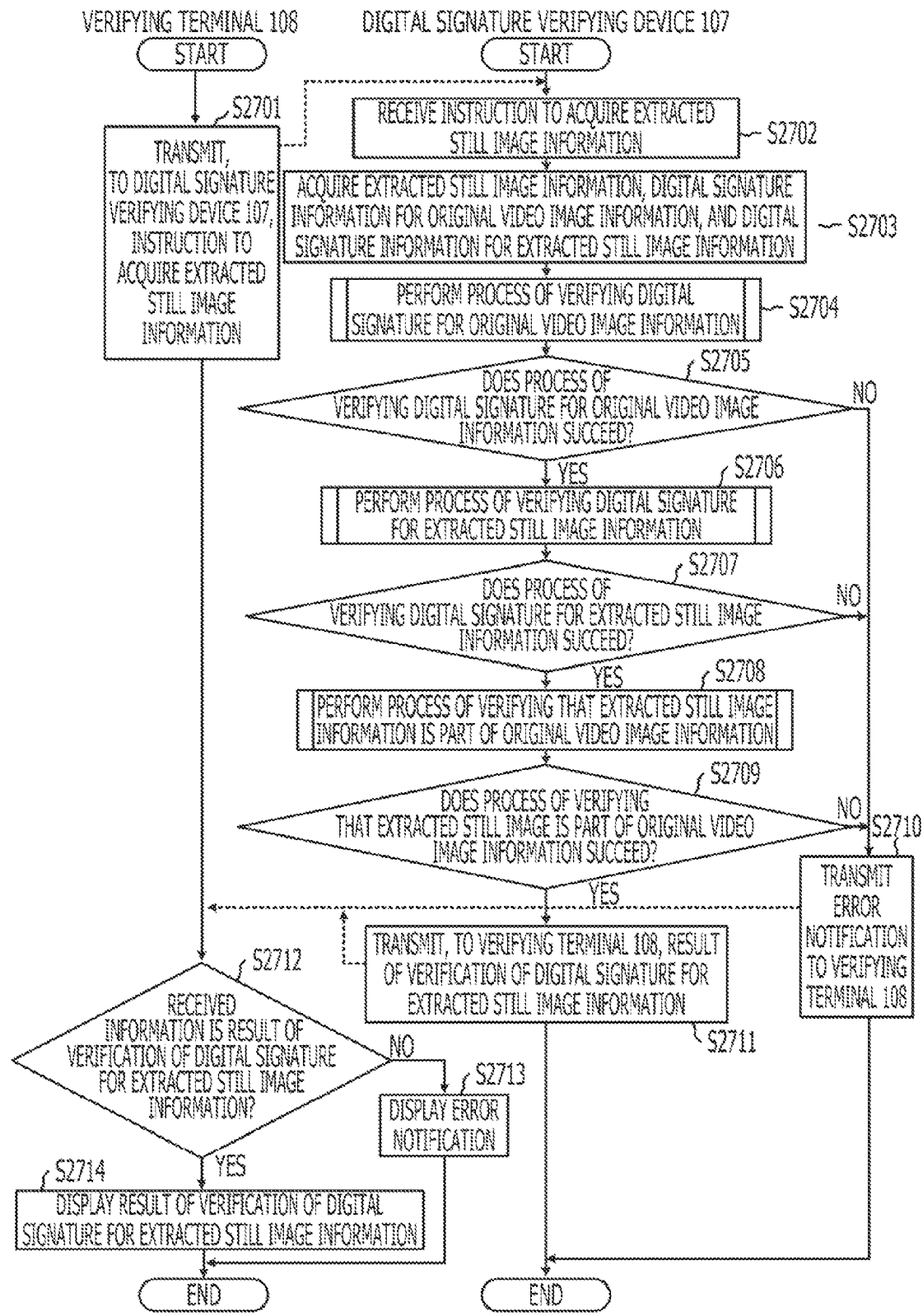
FIG. 27 is a flowchart of a process of extracting still image information.

FIG. 27 is a flowchart of the process of extracting still image information. The verifying terminal 108 transmits, to the digital signature verifying device 107, an instruction to extract still image information (S2701). An example of the instruction is illustrated in FIG. 17. After the transmission of the instruction, the verifying terminal 108 stands by until the verifying terminal 108 receives a response from the digital signature verifying device 107.

The digital signature verifying device 107 receives the instruction to extract the still image information (S2702). The digital signature verifying device 107 acquires the extracted still image information, the digital signature information for the original video image information, and the digital signature information for the extracted still image information from the video image management database 501 through the video image management table 502 (S2703). Subsequently, the digital signature verifying device 107 performs the process of verifying the digital signature for the original video information (S2704). In the process of verifying the digital signature for the original video image information, the digital signature verifying device 107 verifies the digital signature (added to the digital signature information for the original video image information) and confirms whether or not the digital signature information for the original video image information is altered after the generation of the digital signature information.

After the verification, the digital signature verifying device 107 confirms whether or not the process of verifying the digital signature information for the original video image information succeeds (S2705). When the process of verifying the digital signature information for the original video image information succeeds (Yes in S2705), the digital signature verifying device 107 subsequently performs the process of verifying the digital signature for the extracted still image information (S2706). The process of verifying the digital signature for the extracted still image information is described later in detail with reference to FIG. 28. When the process of verifying the digital signature for the original video image information fails (No in S2705), the digital signature verifying device 107 causes the process to proceed to S2710.

After the verification, the digital signature verifying device 107 confirms whether or not the process of verifying the digital signature for the extracted still image information succeeds (S2707). When the process of verifying the digital signature for the extracted still image information succeeds (Yes in S2707), the digital signature verifying device 107 subsequently performs the process of verifying that the extracted still image information is a part of the original video image information (S2708). The process of verifying that the extracted still image information is a part of the original video image information is described later in detail with reference to FIG. 29. When the process of verifying the digital signature for the extracted still image information fails (No in S2707), the digital signature verifying device 107 causes the process to proceed to S2710.

After the verification, the digital signature verifying device 107 confirms whether or not the process of verifying that the extracted still image information is a part of the original video image information succeeds (S2709). When the process of verifying that the extracted still image information is a part of the original video image information succeeds (Yes in S2709), the digital signature verifying device 107 transmits, to the verifying terminal 108, the result of the verification of the digital signature for the extracted still image information (S2711). When the process of verifying that the extracted still image information is a part of the original video image information fails (No in S2709), the digital signature verifying device 107 causes the process to proceed to S2710. When the answer is No in S2705, S2707 or S2709, the digital signature verifying device 107 transmits an error notification to the verifying terminal 108 (S2710).

The verifying terminal 108 receives information from the digital signature verifying device 107 and confirms whether or not the received information is the result of the verification of the digital signature for the extracted still image information (S2712). When the received information is the result of the verification of the digital signature for the extracted still image information (Yes in S2712), the verifying terminal 108 displays the result of the verification of the digital signature for the extracted still image information (S2714). An example of the displayed verification result is described above with reference to FIG. 18. When the received information is the error notification (No in S2712), the verifying terminal 108 displays the error notification (S2713).

Figure 28:
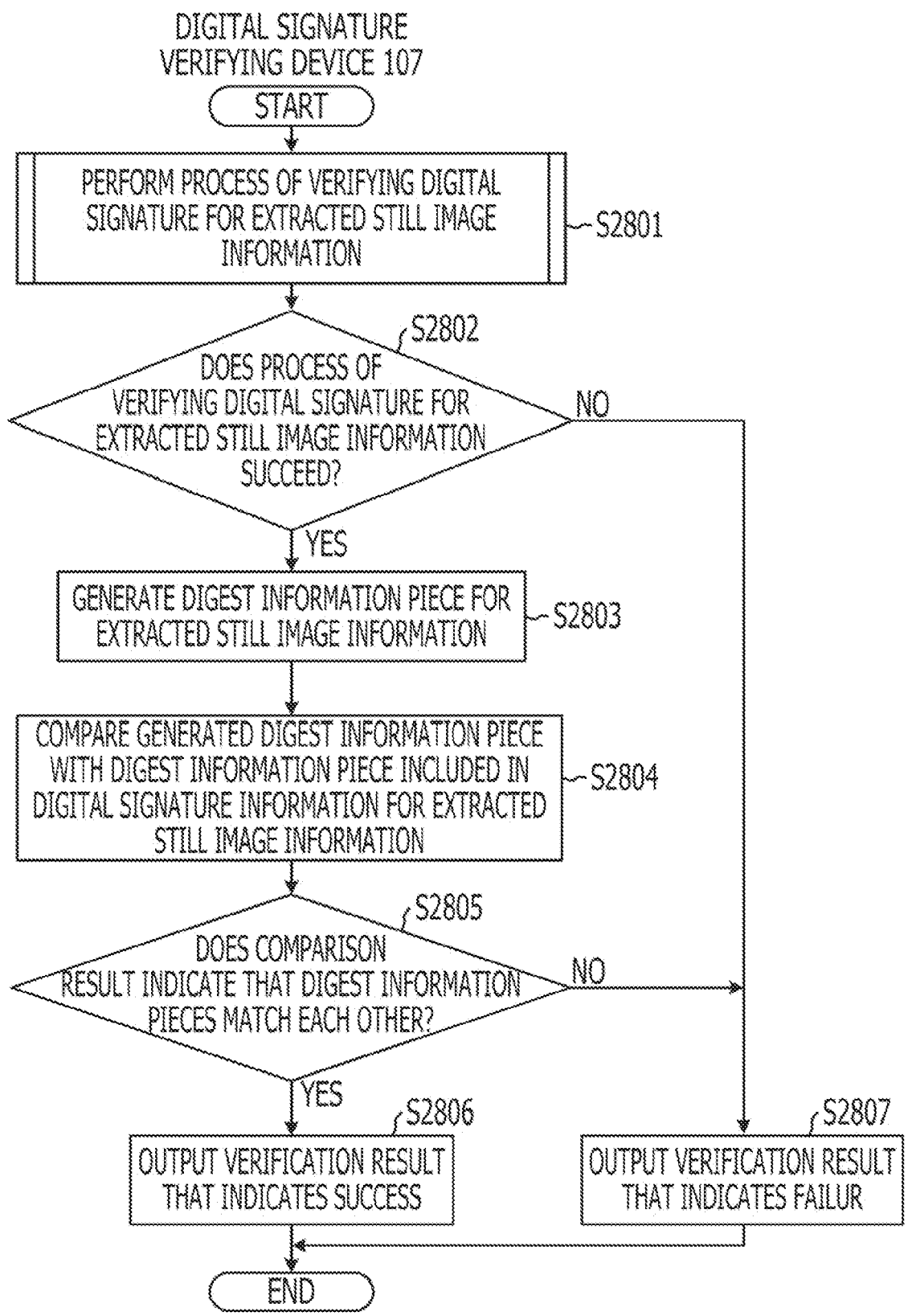
FIG. 28 is a flowchart of a process of verifying the digital signature for the extracted still image information.

FIG. 28 is a flowchart of the process of verifying the digital signature for the extracted still image information. The digital signature verifying device 107 performs the process of verifying the digital signature for the extracted still image information (S2801). S2801 is performed in order to confirm that the digital signature information for the extracted still image information is not altered after the generation of the digital signature information for the extracted still image information. The digital signature verifying device 107 confirms whether or not the process of verifying the digital signature for the extracted still image information succeeds (S2802). When the process of verifying the digital signature for the extracted still image information succeeds (Yes in S2802), the digital signature verifying device 107 generates a digest information for the extracted still image information (S2803). When the process of verifying the digital signature for the extracted still image information fails (No in S2802), the digital signature verifying device 107 outputs the verification result that indicates failure (S2807).

After the generation of the digest information, the digital signature verifying device 107 compares the generated digest information with the digest information included in the digital signature information for the extracted still image information (S2804) and confirms whether or not the generated digest information matches the digest information included in the digital signature information for the extracted still image information (S2805). When the generated digest information matches the digest information included in the digital signature information for the extracted still image information (Yes in S2805), the digital signature verifying device 107 outputs the verification result that indicates success (S2806). When the generated digest information does not match the digest information included in the digital signature information for the extracted still image information (No in S2805), the digital signature verifying device 107 causes the process to proceed to S2807.

FIG. 29 is a flowchart of the process of verifying that the extracted still image information is a part of the original video image information. The process illustrated in FIG. 29 is performed when the position of the extracted still image information in the original video image information is not obvious. The case in which the position of the extracted still image information in the original video image information is obvious is described after the description of the process illustrated in FIG. 29.

The digital signature verifying device 107 sets a counter i to 1 (S2901). The digital signature verifying device 107 acquires digest information of the i-th frame from the digital signature information for the original video image information (S2902). After the acquisition, the digital signature verifying device 107 compares the acquired digest information with the digest information for the extracted still image information (S2903) and confirms whether or not the acquired digest information matches the digest information for the extracted still image information (S2904). When the acquired digest information matches the digest information for the extracted still image information (Yes in S2904), the digital signature verifying device 107 determines that the digest information of the i-th frame matches the digest information for the extracted still image information. Then, the digital signature verifying device 107 outputs the verification result that indicates success (S2908).

When the comparison result indicates that the acquired digest information does not match the digest information for the extracted still image information (No in S2904), the digital signature verifying device 107 confirms whether or not the i-th frame is the last frame (S2905). When the i-th frame is the last frame (Yes in S2905), the digital signature verifying device 107 determines that the acquired digest information does not match any of the digest information included in the digital signature information for the original video image information. Then, the digital signature verifying device 107 outputs the verification result that indicates failure (S2907). When the i-th frame is not the last frame (No in S2905), the digital signature verifying device 107 increments the counter i by 1 (S2906) and causes the process to proceed S2902.

When the position of a frame corresponding to the extracted still image information in the original video image information is obvious, the digital signature verifying device 107 sets the counter i to the number of the position of the frame corresponding to the extracted still image information from the position of the first frame. When the comparison result indicates that the acquired digest information does not match the digest information for the extracted still image information in S2904, the digital signature verifying device 107 performs the same operation as the operation that is performed when the answer is Yes in S2905. In this manner, when the position of the frame corresponding to the extracted still image information in the original video image information is obvious, the digital signature verifying device 107 performs the aforementioned operations. Thus, the process of verifying that the extracted still image information is a part of the original video image information can be performed at a high speed when the position of the frame corresponding to the extracted still image information in the original video image information is obvious.

As described above, in the digital signature apparatus, the digital signature method and the digital signature program, video image data is encoded into an image format on the basis of predicted frames and frames referenced for prediction so that still images are generated, and a summary information is generated for each of the still images. Thus, the still images can be normally written.

In addition, a summary information may be generated for a still image to be verified, and the validity of the still image may be verified using a group of summary information that have been already generated. Thus, it can be proven to a third party that the still image to be verified is a part of the original video image data and is not altered. In addition, a person who has operated a device to cause the device to extract the still image can be clarified from the digital signature for the digital signature information of the extracted still image information. Thus, even when another third party alters the extracted still image information, adds some data to the extracted still image information, or the like, it is possible to trace the alteration, addition or the like.

In addition, at least one parameter is used in order to encode a frame of video image data into an image format, and the same parameter may be used in order to encode the frame into the image format in the process of verifying a digital signature. Thus, the same still image can be obtained in the process of generating the digital signature and the process of verifying the digital signature, and it is possible to ensure that the still image is a part of the original video image data. In addition, when the parameter is set, the extracted still image is more excellent, for example, can be easily viewed or has a smaller data size, compared with the case in which the parameter is not changed.

The video image data is encoded into an image format according to the inter-frame compression technique. However, the video image data may not be encoded an image format according to the inter-frame compression technique. Specifically, for example, when the video image data is encoded into Motion JPEG format, and digest information are generated without changing frames, it is possible to perform normal writing and ensure the originality of the video image data. When the video image data is applied to the present embodiment, or when a digest information is generated for each of the frames after one of the parameters, luminance, is changed, the still image is more excellent, for example, can be more easily viewed or has a smaller data size, compared with the case in which the parameter is not changed.

The digital signature method described in the present embodiment can be achieved by causing a computer (such as a personal computer or a work station, for example) to execute the prepared program. The digital signature program is stored in a storage medium (such as a hard disk, a flexible disk, a CD-ROM, an MO or a DVD, for example) that can be read by the computer. However, a transitory transmission medium such as a propagation signal is not included in the storage medium here. The digital signature program is executed by causing the computer to read the storage medium. In addition, the digital signature program may be delivered through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital signature apparatus comprising:
a memory configured to store a program including a process; and
a processor configured to execute the program, the process comprising:
converting, based on a preceding first video image frame being independently replayable and a subsequent third video image frame not being independently replayable, a predicted frame being not independently replayable into a second video image frame being independently replayable, the first video image frame, the third video image frame and the predicted frame being included in a video image information;
encoding the first, second, or third video image frame into an image data according to an image format and a parameter, the parameter being selected from among a first parameter setting and a second parameter setting according to a condition where the video image information has been obtained, the first parameter setting being used for the encoding when the video image information has been obtained under a first condition, the second parameter setting being used for the encoding when the video image information has been obtained under a second condition other than the first condition and including at least one parameter setting for adjusting the image data to a brightness other than a brightness of the video image information;
transferring, when receiving the predicted frame, the predicted frame to the converting, and transferring, when receiving the first, second, or third video image frame, the received video image frame to the encoding;
storing the image data encoded by the encoding corresponding to a designated image frame in the video image information independently of the video image information;
generating a digest information for each of image data encoded by the encoding;
holding the parameter used for the encoding of the first, second, or third video image frame being desirable for displaying information; and
generating a digital signature of the digest information and the parameter.

2. The digital signature apparatus according to claim 1, the process further comprising:
verifying, using a group of the digest information generated by the generating, a validity of an image data to be verified, the image data to be verified being the image data stored by the storing,
wherein a digest information for the image data to be verified is generated, and
verifying the validity of the image data to be verified, from the group of generated digest information, a digest information that matches the digest information for the image data.

3. The digital signature apparatus according to claim 2, the process further comprising:
holding at least one parameter that is related to the encoding into the image format,
wherein the first, second, or third video image frame is encoded into an image data according to the image format and the at least one parameter held by the holding,
generating a digest information for the encoded image data using the at least one parameter held by the holding, and verifying the validity of the image data to be verified, from a group of digest information generated based on the at least one parameter held by the holding, a digest information that matches the digest information for the image data.

4. A digital signature method that is implemented in a computer, the method comprising:
converting, based on a preceding first video image frame being independently replayable and a subsequent third video image frame not being independently replayable, a predicted frame being not independently replayable into a second video image frame being independently replayable, the first video image frame, the third video image frame and the predicted frame being included in a video image information in a first format;
encoding the first, second, or third video image frame into an image data in a second format according to an image format, the second format being a still image format different from the first format and enabling the image data to display independently of the video image information;
transferring, when receiving the predicted frame, the predicted frame to the converting, and when receiving the first, second, or third video image frame, transferring the received video image frame to the encoding;
generating a digest information for each of encoded image data; and
generating a digital signature of the digest information.

5. The digital signature method according to claim 4, further comprising:
verifying a validity of an image data using a group of the generated digest information, the image data to be verified,
wherein in the generating, a digest information is generated for the image data to be verified, and
in the verifying, the validity of the image data to be verified is verified, from the group of generated digest information, a digest information that matches the digest information for the image data.

6. The digital signature method according to claim 5, further comprising:
holding at least one parameter that is related to the encoding into the image format,
wherein in the encoding, the first, second, or third video image frame is encoded into an image data according to the image format and the at least one held parameter,
in the generating, a digest information is generated for the image data encoded using the at least one held parameter, and
in the verifying, the validity of the image data to be verified is verified, from a group of digest information generated based on the at least one held parameter, a digest information that matches the digest information for the image data.

7. A non-transitory computer-readable storage medium storing a program causing a computer to execute a digital signature process, the digital signature process comprising:
converting, based on a preceding first video image frame and a subsequent third video image frame, a predicted frame into a second video image frame, the first and second video image frames being independently replayable, the predicted frame and the subsequent third video image frame being not independently replayable, the first video image frame, the third video image frame and the predicted frame being included in a video image information in a first format;
encoding the first, second, or third video image frame into an image data in a second format according to an image format, the second format being a still image format different from the first format and enabling the image data to display independently of the video image information;
transferring, when receiving the predicted frame, the predicted frame to the converting, and transferring, when receiving the first, second, or third video image frame, the received video image frame to the encoding;
generating a digest information for each of encoded image data; and
generating a digital signature of the digest information.

8. The non-transitory computer-readable storage medium according to claim 7, the digital signature process further comprising:
verifying a validity of an image data using a group of the generated digest information, the image data to be verified,
wherein in the generating, a digest information is generated for the image data to be verified, and
in the verifying, the validity of the image data to be verified is verified, from the group of generated digest information, a digest information that matches the digest information for the image data.

9. The non-transitory computer-readable storage medium according to claim 8, the digital signature process further comprising:
holding at least one parameter that is related to the encoding into the image format,
wherein in the encoding, the first, second, or third video image frame is encoded into an image data according to the image format and the at least one held parameter,
in the generating, a digest information is generated for the image data encoded using the at least one held parameter, and
in the verifying, the validity of the image data to be verified is verified, from a group of digest information generated based on the at least one held parameter, a digest information that matches the digest information for the image data.

10. The digital signature apparatus according to claim 1, wherein
the video image information is a video in a first format, and
the image data is a still image in a second format different from the first format and the second format enables the image data to display independently of the video image information.

11. The digital signature method according to claim 4, wherein
the encoding encodes the first, second, or third video image frame into the image data in the second format according to the image format and a parameter, and
the generating of the digital signature generates the digest information and the parameter used by the encoding.

12. The digital signature method according to claim 4, wherein
the encoding encodes the first, second, or third video image frame into the image data in the second format according to the image format and a parameter,
the digital signature method further comprising:
selecting the parameter from among a first parameter setting and a second parameter setting according to a condition where the video image information has been obtained, the first parameter setting being used for the encoding when the video image information has been obtained under a first condition, the second parameter setting being used for the encoding when the video image information has been obtained under a second condition other than the first condition and including at least one parameter setting for adjusting the image data to a brightness other than a brightness of the video image information.

13. The digital signature method according to claim 4, further comprising:
generating a digital signature of the video image information; and
managing a correspondence relationship with the image data, the digital signature of the video image information and the digital signature of the digest information.

14. The digital signature method according to claim 4, wherein
the encoding encodes the first, second, or third video image frame into the image data in the second format according to the image format and a parameter,
the digital signature method further comprising:
holding the parameter used for the encoding of the first, second, or third video image frame being desirable for displaying information.

15. The non-transitory computer-readable storage medium according to claim 7, wherein
the encoding encodes the first, second, or third video image frame into the image data in the second format according to the image format and a parameter, and
the generating of the digital signature generates the digest information and the parameter used by the encoding.

16. The non-transitory computer-readable storage medium according to claim 7, wherein
the encoding encodes the first, second, or third video image frame into the image according to the image format and a parameter,
the digital signature process further comprising:
selecting the parameter from among a first parameter setting and a second parameter setting according to a condition where the video image information has been obtained, the first parameter setting being used for the encoding when the video image information has been obtained under a first condition, the second parameter setting being used for the encoding when the video image information has been obtained under a second condition other than the first condition and including at least one parameter for adjusting the image data to a brightness other than a brightness of the video image information.

17. The non-transitory computer-readable storage medium according to claim 7, the digital signature process further comprising:
generating a digital signature of the video image information; and
managing a correspondence relationship with the image data, the digital signature of the video image information and the digital signature of the digest information.

18. The non-transitory computer-readable storage medium according to claim 7, the digital signature process further comprising:
holding the parameter used for the encoding of the first, second, or third video image frame being desirable for displaying information.

19. The digital signature apparatus according to claim 1, wherein the process further comprising:
receiving identification information indicating a certain video image frame in the video image information, wherein
the certain video image frame is encoded into a certain image data by the encoding based on the receiving, and
a certain digest information for the certain image data is generated by the generating, and
the process further comprising:
verifying the digest information for the image data stored by the storing with the certain digest information for the certain image data.

20. The digital signature apparatus according to claim 3, wherein
the holding holds the parameter associated with the video image information, and
the first, second, or third video image frame is encoded into the image data according to the image format and the held parameter associated with the video image information corresponding to the image data to be verified.

* * * * *